(12) United States Patent
Overton

(10) Patent No.: US 8,031,997 B2
(45) Date of Patent: Oct. 4, 2011

(54) REDUCED-DIAMETER, EASY-ACCESS LOOSE TUBE CABLE

(75) Inventor: Bob J. Overton, Lenoir, NC (US)

(73) Assignee: Draka Comteq, B.V., Amsterdam (NL)

( * ) Notice: Subject to any disclaimer, the term of this patent is extended or adjusted under 35 U.S.C. 154(b) by 0 days.

(21) Appl. No.: 12/615,737

(22) Filed: Nov. 10, 2009

(65) Prior Publication Data

US 2010/0092139 A1    Apr. 15, 2010

Related U.S. Application Data

(63) Continuation-in-part of application No. 12/267,732, filed on Nov. 10, 2008.

(60) Provisional application No. 60/986,737, filed on Nov. 9, 2007, provisional application No. 61/041,484, filed on Apr. 1, 2008, provisional application No. 61/112,595, filed on Nov. 7, 2008, provisional application No. 61/113,067, filed on Nov. 10, 2008, provisional application No. 61/177,996, filed on May 13, 2009, provisional application No. 61/248,319, filed on Oct. 2, 2009.

(51) Int. Cl.
G02B 6/44    (2006.01)

(52) U.S. Cl. ......... 385/110; 385/112; 385/113; 385/128

(58) Field of Classification Search .................. 385/128, 385/100, 110, 112, 113
See application file for complete search history.

(56) References Cited

U.S. PATENT DOCUMENTS

| | | | |
|---|---|---|---|
| RE30,635 E | 6/1981 | Kuppers et al. | |
| 4,718,748 A | 1/1988 | Broer et al. | |
| 4,838,643 A | 6/1989 | Hodges et al. | |
| 4,848,869 A | 7/1989 | Urruti | |
| 4,852,968 A | 8/1989 | Reed | |
| 4,904,051 A | 2/1990 | Broer et al. | |
| 5,044,724 A | 9/1991 | Glodis et al. | |
| 5,062,685 A | 11/1991 | Cain et al. | |
| 5,146,531 A | 9/1992 | Shustack | |
| 5,574,816 A | 11/1996 | Yang et al. | |
| 5,717,805 A | 2/1998 | Stulpin | |
| 5,761,362 A | 6/1998 | Yang et al. | |
| 5,911,023 A | 6/1999 | Risch et al. | |

(Continued)

FOREIGN PATENT DOCUMENTS

EP    1116972 A1    7/2001

(Continued)

OTHER PUBLICATIONS

Commonly owned U.S. Appl. No. 12/098,804 filed Apr. 7, 2008.

(Continued)

*Primary Examiner* — Ellen Kim
(74) *Attorney, Agent, or Firm* — Summa, Addition & Ashe, P.A.

(57) ABSTRACT

Disclosed is an improved optical fiber that employs a novel coating system. When combined with a bend-insensitive glass fiber, the novel coating system according to the present invention yields an optical fiber having exceptionally low losses. The coating system features (i) a softer primary coating with excellent low-temperature characteristics to protect against microbending in any environment and in the toughest physical situations and, optionally, (ii) a colored secondary coating possessing enhanced color strength and vividness. The improved coating system provides optical fibers that are useful in relatively thin-walled, low-modulus buffer tubes (i.e., "flextubes") that can be readily accessed without special tools.

23 Claims, 13 Drawing Sheets

U.S. PATENT DOCUMENTS

| | | | |
|---|---|---|---|
| 5,982,968 | A | 11/1999 | Stulpin |
| 6,035,087 | A | 3/2000 | Bonicel et al. |
| 6,041,153 | A | 3/2000 | Yang |
| 6,066,397 | A | 5/2000 | Risch et al. |
| 6,085,009 | A | 7/2000 | Risch et al. |
| 6,134,363 | A | 10/2000 | Hinson et al. |
| 6,175,677 | B1 | 1/2001 | Yang et al. |
| 6,181,857 | B1 | 1/2001 | Emeterio et al. |
| 6,210,802 | B1 | 4/2001 | Risch et al. |
| 6,215,931 | B1 | 4/2001 | Risch et al. |
| 6,240,224 | B1 | 5/2001 | Reekie et al. |
| 6,314,224 | B1 | 11/2001 | Stevens et al. |
| 6,321,012 | B1 | 11/2001 | Shen |
| 6,321,014 | B1 | 11/2001 | Overton et al. |
| 6,334,016 | B1 | 12/2001 | Greer, IV |
| 6,381,390 | B1 | 4/2002 | Hutton et al. |
| 6,400,873 | B1 | 6/2002 | Gimblet et al. |
| 6,411,403 | B1 | 6/2002 | Siddhamalli |
| 6,493,491 | B1 | 12/2002 | Shen et al. |
| 6,603,908 | B2 | 8/2003 | Dallas et al. |
| 6,618,538 | B2 | 9/2003 | Nechitailo et al. |
| 6,658,184 | B2 | 12/2003 | Bourget et al. |
| 6,694,079 | B1 | 2/2004 | Matsuo et al. |
| 6,749,446 | B2 | 6/2004 | Nechitailo |
| 6,901,197 | B2 | 5/2005 | Hasegawa et al. |
| 6,912,347 | B2 | 6/2005 | Rossi et al. |
| 6,922,515 | B2 | 7/2005 | Nechitailo et al. |
| 6,941,049 | B2 | 9/2005 | Risch et al. |
| 6,961,508 | B2 * | 11/2005 | van Eekelen et al. ......... 385/144 |
| 7,045,010 | B2 | 5/2006 | Sturman, Jr. |
| 7,085,466 | B2 * | 8/2006 | Roba et al. .................... 385/128 |
| 7,095,940 | B2 | 8/2006 | Hayami et al. |
| 7,162,128 | B2 | 1/2007 | Lovie et al. |
| 7,171,103 | B2 * | 1/2007 | Eekelen et al. ............... 385/144 |
| 7,200,310 | B2 | 4/2007 | Roba et al. |
| 7,228,040 | B2 | 6/2007 | Nakajima et al. |
| 7,239,784 | B2 | 7/2007 | Hayami et al. |
| 7,272,282 | B1 | 9/2007 | Seddon et al. |
| 7,272,289 | B2 | 9/2007 | Bickham et al. |
| 7,292,762 | B2 | 11/2007 | Guan et al. |
| 7,317,858 | B2 | 1/2008 | Roba et al. |
| 7,322,122 | B2 | 1/2008 | Overton et al. |
| 7,346,244 | B2 | 3/2008 | Gowan et al. |
| 7,356,234 | B2 | 4/2008 | de Montmorillon et al. |
| 7,397,992 | B1 | 7/2008 | Blazer et al. |
| 7,406,232 | B2 | 7/2008 | Stingl et al. |
| 7,415,181 | B2 | 8/2008 | Greenwood et al. |
| 7,433,566 | B2 | 10/2008 | Bookbinder et al. |
| 7,444,838 | B2 | 11/2008 | Pickrell et al. |
| 7,450,806 | B2 | 11/2008 | Bookbinder et al. |
| 7,450,807 | B2 | 11/2008 | Bickham et al. |
| 7,471,862 | B2 | 12/2008 | Bringuier et al. |
| 7,483,613 | B2 | 1/2009 | Bigot-Astruc et al. |
| 7,515,795 | B2 | 4/2009 | Overton et al. |
| 7,526,166 | B2 | 4/2009 | Bookbinder et al. |
| 7,526,169 | B2 | 4/2009 | Bickham et al. |
| 7,555,186 | B2 | 6/2009 | Flammer et al. |
| 7,555,187 | B2 | 6/2009 | Bickham et al. |
| 7,567,739 | B2 | 7/2009 | Overton et al. |
| 7,567,742 | B2 | 7/2009 | Pickrell et al. |
| 7,569,801 | B2 | 8/2009 | Oka |
| 7,570,852 | B2 | 8/2009 | Nothofer et al. |
| 7,574,088 | B2 | 8/2009 | Sugizaki et al. |
| 7,574,095 | B2 | 8/2009 | Lock et al. |
| 7,587,111 | B2 | 9/2009 | de Montmorillon et al. |
| 7,599,589 | B2 | 10/2009 | Overton et al. |
| 7,623,747 | B2 | 11/2009 | de Montmorillon et al. |
| 7,639,915 | B2 | 12/2009 | Parris et al. |
| 7,646,954 | B2 | 1/2010 | Tatat |
| 7,665,902 | B2 | 2/2010 | Griffioen et al. |
| 2004/0013382 | A1 | 1/2004 | van Eekelen et al. |
| 2004/0022511 | A1 | 2/2004 | Eekelen et al. |
| 2005/0089289 | A1 | 4/2005 | Hayami et al. |
| 2006/0024010 | A1 * | 2/2006 | van Eekelen et al. ......... 385/128 |
| 2007/0019915 | A1 | 1/2007 | Overton et al. |
| 2007/0025668 | A1 | 2/2007 | Greenwood et al. |
| 2007/0077016 | A1 * | 4/2007 | Bickham et al. ............... 385/128 |
| 2007/0098339 | A1 | 5/2007 | Bringuier et al. |
| 2007/0127878 | A1 | 6/2007 | Montmorillon et al. |
| 2007/0183726 | A1 | 8/2007 | Nothofer et al. |
| 2007/0263960 | A1 | 11/2007 | Lock et al. |
| 2007/0280615 | A1 | 12/2007 | de Montmorillon et al. |
| 2008/0037942 | A1 | 2/2008 | Tatat |
| 2008/0056654 | A1 | 3/2008 | Bickham et al. |
| 2008/0145010 | A1 | 6/2008 | Overton et al. |
| 2008/0152288 | A1 | 6/2008 | Flammer et al. |
| 2008/0166094 | A1 | 7/2008 | Bookbinder et al. |
| 2008/0181564 | A1 | 7/2008 | Overton et al. |
| 2008/0240662 | A1 * | 10/2008 | Helvenstein .................. 385/106 |
| 2008/0273845 | A1 | 11/2008 | Weimann |
| 2008/0292262 | A1 | 11/2008 | Overton et al. |
| 2008/0304800 | A1 | 12/2008 | Bickham et al. |
| 2008/0317410 | A1 | 12/2008 | Griffioen et al. |
| 2009/0003779 | A1 | 1/2009 | Parris |
| 2009/0003781 | A1 | 1/2009 | Parris et al. |
| 2009/0003785 | A1 | 1/2009 | Parris et al. |
| 2009/0041414 | A1 | 2/2009 | Lavenne et al. |
| 2009/0060437 | A1 | 3/2009 | Fini et al. |
| 2009/0074364 | A1 | 3/2009 | Bringuier et al. |
| 2009/0126407 | A1 | 5/2009 | Bookbinder et al. |
| 2009/0154888 | A1 | 6/2009 | Abbott, III et al. |
| 2009/0169163 | A1 | 7/2009 | Abbott, III et al. |
| 2009/0175583 | A1 | 7/2009 | Overton |
| 2009/0214167 | A1 | 8/2009 | Lookadoo et al. |
| 2009/0232461 | A1 * | 9/2009 | Nakajima et al. ............. 385/114 |
| 2009/0245740 | A1 | 10/2009 | Weimann |
| 2009/0252469 | A1 | 10/2009 | Sillard et al. |
| 2009/0274424 | A1 | 11/2009 | Debut et al. |
| 2009/0279833 | A1 | 11/2009 | Overton et al. |
| 2009/0279835 | A1 | 11/2009 | De Montmorillon et al. |
| 2009/0279836 | A1 | 11/2009 | de Montmorillon et al. |
| 2009/0297170 | A1 | 12/2009 | Tatat |
| 2009/0324183 | A1 | 12/2009 | Bringuier et al. |
| 2010/0021170 | A1 | 1/2010 | Lumineau et al. |
| 2010/0028020 | A1 | 2/2010 | Gholami et al. |
| 2010/0067855 | A1 | 3/2010 | Barker |
| 2010/0067857 | A1 | 3/2010 | Lovie et al. |
| 2010/0067859 | A1 | 3/2010 | de Montmorillon et al. |
| 2010/0092135 | A1 | 4/2010 | Barker et al. |
| 2010/0092138 | A1 | 4/2010 | Overton |
| 2010/0092139 | A1 | 4/2010 | Overton |
| 2010/0092140 | A1 | 4/2010 | Overton |
| 2010/0118388 | A1 | 5/2010 | Pastouret et al. |
| 2010/0119202 | A1 | 5/2010 | Overton |
| 2010/0135623 | A1 | 6/2010 | Overton |
| 2010/0135624 | A1 | 6/2010 | Overton et al. |
| 2010/0135625 | A1 | 6/2010 | Overton |
| 2010/0135627 | A1 | 6/2010 | Pastouret et al. |
| 2010/0142033 | A1 | 6/2010 | Regnier et al. |
| 2010/0142969 | A1 | 6/2010 | Gholami et al. |
| 2010/0166375 | A1 | 7/2010 | Parris |
| 2010/0183821 | A1 | 7/2010 | Hartsuiker et al. |
| 2010/0209058 | A1 | 8/2010 | Ott |
| 2010/0209059 | A1 * | 8/2010 | Conrad et al. ................. 385/110 |

FOREIGN PATENT DOCUMENTS

| | | |
|---|---|---|
| EP | 1650174 A2 | 4/2006 |
| EP | 1785754 A1 | 5/2007 |
| EP | 1845399 A1 | 10/2007 |
| EP | 1921478 A1 | 5/2008 |
| EP | 1930753 A1 | 6/2008 |
| WO | 01/05724 A2 | 1/2001 |
| WO | 02/055614 A2 | 7/2002 |
| WO | 03/091177 A1 | 11/2003 |
| WO | 03/091178 A | 11/2003 |
| WO | 03/091781 A1 | 11/2003 |
| WO | 2007/013923 A2 | 2/2007 |
| WO | 2008/037291 A1 | 4/2008 |
| WO | 2008/157341 A2 | 12/2008 |
| WO | 2009/062131 A1 | 5/2009 |
| WO | 2009/064381 A1 | 5/2009 |
| WO | 2010/053356 A2 | 5/2010 |

OTHER PUBLICATIONS

International Preliminary Report on Patentability for International Application No. PCT/US2008/082927, mailed May 20, 2010.

U.S. Appl. No. 61/147,586 filed Jan. 27, 2009.
U.S. Appl. No. 61/147,590 filed Jan. 27, 2009.
U.S. Appl. No. 61/154,538 filed Feb. 23, 2009.
U.S. Appl. No. 61/248,319 filed Oct. 2, 2009.
U.S. Appl. No. 61/239,055 filed Sep. 1, 2009.
U.S. Appl. No. 61/242,618 filed Sep. 15, 2009.
U.S. Appl. No. 61/155,317 filed Feb. 25, 2009.
U.S. Appl. No. 61/185,462 filed Jun. 9, 2009.
U.S. Appl. No. 61/230,158 filed Jul. 31, 2009.
U.S. Appl. No. 61/241,592 filed Sep. 11, 2009.
U.S. Appl. No. 61/243,626 filed Sep. 18, 2009.
U.S. Appl. No. 61/242,287 filed Sep. 14, 2009.
Commonly owned U.S. Appl. No. 12/774,845 filed May 6, 2010.
Corning, "High Temperature/Harsh Environment Single-mode & Multimode Specialty Fibers," PI 1500, Issued Jan. 2008.
U.S. Appl. No. 60/986,737, filed Nov. 9, 2007.
U.S. Appl. No. 61/041,484, filed Apr. 11, 2008.
U.S. Appl. No. 61/112,595, filed Nov. 7, 2008.
U.S. Appl. No. 61/101,337, filed Sep. 30, 2008.
U.S. Appl. No. 61/112,006, filed Nov. 6, 2008.
U.S. Appl. No. 61/112,374, filed Nov. 7, 2008.
U.S. Appl. No. 61/096,545, filed Sep. 12, 2008.
U.S. Appl. No. 61/096,750, filed Sep. 12, 2008.
Draka, Product Specification for BendBright Single Mode Optical Fibre, Issue date Oct. 2007.
Draka, Product Specification for Enhanced Single Mode Optical Fibre (ESMF), Issue date Oct. 2007.
Draka, Product Specification for BendBright XS Single Mode Optical Fibre, Issue date Oct. 2007.
Draka, Product Specification for Cabling Options-Optical Fiber Types, Issue date May 26, 2006.
Overton et al., Microbending-Resistant Fiber, Draka Communications, IWCS Proceedings (Nov. 2008).
Overton, et al., New Optical Fiber Coating System Optimized for FTTx Applications, Draka Comteq, IWCS Proceedings, Orlando, FL (Nov. 2007).
Draka, Product Specification for Enhanced Single Mode Optical Fibre (ESMF), Issue date Sep. 2008.
Draka, Product Specification for BendBright XS Single Mode Optical Fibre, Issue date Sep. 2008.
U.S. Appl. No. 61/177,996, filed May 13, 2009.
International Search Report and Written Opinion for International Application No. PCT/US2008/082927, dated Mar. 31, 2009.
Corning, Product Information for "Corning ClearCurve Optical Fiber With Corning nanoStructures Technology," (Feb. 2009).
Ramachandran, et al., "Measurement of Multipath Interference in the Coherent Crosstalk Regime," IEEE Photonics Technology Letters, vol. 15, No. 8, pp. 1171-1173, Aug. 2003.
Zheng et al., "Measurement and System Impact of Multipath Interference From Dispersion Compensating Fiber Modules," IEEE Transaction on Instrumentation and Measurement, vol. 53, No. 1, pp. 15-23, Feb. 2004.
Botineau et al. In "Effective Stimulated Brillouin Gain in Single Mode Optical Fibers," Electronics Letters, vol. 31, No. 23 (1995).

* cited by examiner

REDUCED-DIAMETER, EASY-ACCESS LOOSE TUBE CABLE

CROSS-REFERENCE TO PRIORITY APPLICATIONS

This application is a continuation-in-part of U.S. patent application Ser. No. 12/267,732 for a Microbend-Resistant Optical Fiber (filed Nov. 10, 2008, and published Jul. 9, 2009, as U.S. Patent Application Publication No. 2009/0175583 A1), which itself claims the benefit of U.S. Provisional Application No. 60/986,737 for a Microbend-Resistant Optical Fiber (filed Nov. 9, 2007), U.S. Provisional Application No. 61/041,484 for a Microbend-Resistant Optical Fiber (filed Apr. 1, 2008), and U.S. Provisional Application No. 61/112,595 for a Microbend-Resistant Optical Fiber (filed Nov. 7, 2008).

This application further claims the benefit of U.S. Provisional Application No. 61/113,067 for a Reduced-Diameter, Easy-Access Loose Tube Cable (filed Nov. 10, 2008), U.S. Provisional Application No. 61/177,996 for a Reduced-Diameter Optical Fiber (filed May 13, 2009), and U.S. Provisional Application No. 61/248,319 for a Reduced-Diameter Optical Fiber (filed Oct. 2, 2009).

Each of the foregoing commonly assigned patent applications and patent publication is hereby incorporated by reference in its entirety.

FIELD OF THE INVENTION

The present invention embraces optical fibers possessing an improved coating system that reduces stress-induced microbending. The present invention further embraces the deployment of such optical fibers in reduced-diameter, easy-access loose-tube cables.

BACKGROUND OF THE INVENTION

Fiber to the premises/business/home (i.e., FTTx) provides broadband data transfer technology to the individual end-user. FTTx installations, which are being increasingly deployed throughout the world, are making use of innovative, reduced-cost system designs to promote the spread of the technology. For example, fiber may be delivered in the last link by way of a microcable. Air-blown fibers provide another efficient model for delivering the link to the end-use terminus. There continues to be industry-wide focus on modes of deployment that overcome economic obstacles that impede fiber-based broadband solutions for data transmission to businesses and residences.

Cost-effectiveness is important, of course, for achieving successful FTTx systems. Reduced size for cables, drops, and structures for blowing are often critical, too. Installation of conduits suitable for traditional cable designs is often prohibitive in existing infrastructure. Thus, existing small ducts or tight pathways have to be used for new fiber installations. Low-cost and reduced-size requirements are driving in a direction that reduces protection for the optical fibers (i.e., away from conventionally robust, more bulky cable designs).

Glass designs are now available that offer reduced sensitivity to small bending radius (i.e., decreased added attenuation due to the phenomenon known as macrobending). These include trench-assisted core design or void-assisted fibers. Glass designs with lower mode field diameter are less sensitive to macrobending effects, but are not compatible with the G.652 SMF standard. Single-mode optical fibers that are compliant with the ITU-T G.652.D requirements are commercially available, for instance, from Draka Comteq (Claremont, N.C.).

Microbending is another phenomenon that induces added loss in fiber signal strength. Microbending is induced when small stresses are applied along the length of an optical fiber, perturbing the optical path through microscopically small deflections in the core.

In this regard, U.S. Pat. No. 7,272,289 (Bickham et al.), which is hereby incorporated by reference in its entirety, proposes an optical fiber having low macrobend and microbend losses. U.S. Pat. No. 7,272,289 broadly discloses an optical fiber possessing (i) a primary coating having a Young's modulus of less than 1.0 MPa and a glass transition temperature of less than −25° C. and (ii) a secondary coating having a Young's modulus of greater than 1,200 MPa.

Nonetheless, better protection against microbending is still needed to help ensure successful deployment in more FTTx applications. To this end, it is necessary to discover and implement new coating systems that better address the demands FTTx installations place on fiber and cable structures in a way that is commercially practical (i.e., cost-effective).

SUMMARY OF THE INVENTION

Accordingly, it is an object of the present invention to provide an optical fiber having an improved coating system that provides improved protection against stress-induced microbending.

It is another object to provide an improved coating system that can be readily mated with either single-mode optical fiber or multimode optical fiber.

It is yet another object to provide an improved coating system that can be readily mated with bend-insensitive optical fiber.

It is yet another object to provide an improved optical fiber coating system including a primary coating that possesses a low modulus to provide enhanced cushioning against lateral and axial stresses induced by external forces.

It is yet another object to provide an improved optical fiber coating system including a primary coating that possesses an exceptionally low glass transition temperature ($T_g$) that reduces temperature-induced stresses in unusually cold environments.

It is yet another object to provide an improved optical fiber coating system including a primary coating that possesses an improved curing rate.

It is yet another object to provide an improved optical fiber coating system including an ink-free secondary coating that has improved brightness and visibility.

It is yet another object to provide an improved optical fiber coating system that can be applied at commercial processing speeds (e.g., forming the primary coating at rates of at least about 20 meters per second).

It is yet another object to provide an optical fiber possessing coatings that are readily stripped.

It is yet another object to provide an optical fiber having enhanced performance characteristics for use in FTTx installations in which conventional, robust cable designs are impractical.

It is yet another object to provide an optical fiber that synergistically combines a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

It is yet another object to provide an optical fiber that can be advantageously deployed in buffer tubes and/or fiber optic cables.

It is yet another object to provide an optical fiber that requires less external protection (e.g., enclosed within thinner buffer tubes and/or cable jacketing).

It is yet another object to provide a bend-insensitive optical fiber possessing a reduced diameter (e.g., having thinner coating layers and/or a thinner component glass fiber).

It is yet another object to provide a reduced-diameter optical fiber that requires less deployment space (e.g., within a buffer tube and/or fiber optic cable), thereby facilitating increased fiber count and/or reduced cable size.

It is yet another object to provide an optical fiber that can be installed in a way that employs small-radius bends.

It is yet another object to provide an optical fiber that facilitates direct installation onto buildings or other structures (e.g., stapled or otherwise secured to structural surfaces).

It is yet another object to provide a 200-micron single-mode optical fiber that provides significantly better microbending performance than that of a standard single-mode optical fiber (SSMF) that employs conventional primary and secondary coatings (i.e., at an outer diameter of about 235-265 microns).

The foregoing, as well as other objectives and advantages of the invention, and the manner in which the same are accomplished, are further specified within the following detailed description and its accompanying drawings.

DETAILED DESCRIPTION

Figure 1:
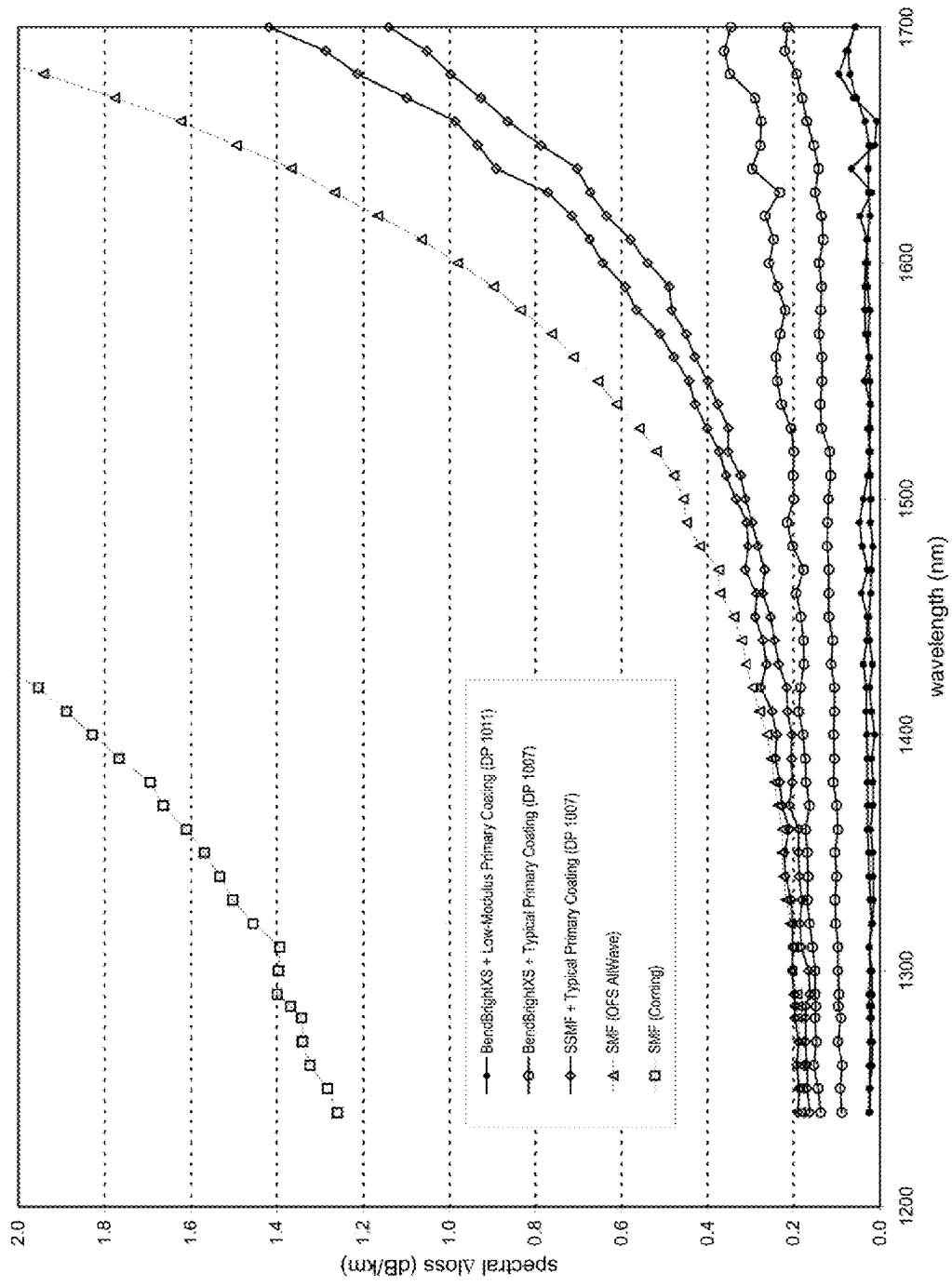
FIG. 1 depicts microbend testing results demonstrating that exceptionally low microbending losses are achieved, in accordance with the present invention, by pairing a bend-insensitive glass fiber with a low-modulus primary coating.

In one aspect, the present invention embraces optical fibers possessing an improved coating system that reduces stress-induced microbending, even in exceptionally cold environments required for FTTx deployments. The coating system according to the present invention includes a primary coating that combines low in situ modulus (e.g., less than about 0.5 MPa as measured on the fiber) and low glass transition temperature ($T_g$) (e.g., less than about −50° C.) to reduce stresses caused by external force and temperature. In addition, the coating system can be processed at high production speeds (e.g., 15-20 msec or more).

The present invention achieves a microbend-resistant optical fiber, particularly a single-mode optical fiber, by employing as its primary coating a UV-curable, urethane acrylate composition. In this regard, the primary coating includes between about 40 and 80 weight percent of polyether-urethane acrylate oligomer as well as photoinitiator, such as LUCERIN TPO, which is commercially available from BASF. In addition, the primary coating includes one or more oligomers and one or more monomer diluents (e.g., isobornyl acrylate), which may be included, for instance, to reduce viscosity and thereby promote processing. A suitable composition for the primary coating according to the present invention is a UV-curable urethane acrylate product provided by DSM Desotech (Elgin, Ill.) under the trade name DeSolite® DP 1011.

In this regard, this application incorporates entirely by reference the following commonly assigned patent application publications and patent applications: U.S. Patent Application No. 60/986,737 for a Microbend-Resistant Optical Fiber, filed Nov. 9, 2007, (Overton); U.S. Patent Application No. 61/041,484 for a Microbend-Resistant Optical Fiber, filed Apr. 1, 2008, (Overton); U.S. Patent Application No. 61/112,595 for a Microbend-Resistant Optical Fiber, filed Nov. 7, 2008, (Overton); International Patent Application Publication No. WO 2009/062131 A1 for a Microbend-Resistant Optical Fiber, (Overton); and U.S. Patent Application Publication No. US2009/0175583 A1 and its counterpart U.S. patent application Ser. No. 12/267,732 for a Microbend-Resistant Optical Fiber, (Overton).

This application further incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Patent Application Publication No. US2007/0127878 A1 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. patent application Ser. No. 12/098,804 for a Transmission Optical Fiber Having Large Effective Area (Sillard et al.), filed Apr. 7, 2008; U.S. Patent Application Publication No. US2009/0252469 A1 for a Dispersion-Shifted Optical Fiber (Sillard et al.); U.S. patent application Ser. No. 12/436,423 for a Single-Mode Optical Fiber Having Reduced Bending Losses, filed May 6, 2009, (de Montmorillon et al.); U.S. patent application Ser. No. 12/436,484 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); and U.S. patent application Ser. No. 12/614,172 for a Multimode Optical System, filed Nov. 6, 2009, (Gholami et al.); U.S. Patent Application No. 61/101,337 for a Bend-Insensitive Optical Fiber, filed Sep. 30, 2008, (de Montmorillon et al.); U.S. Patent Application No. 61/112,006 for a Bend-Insensitive Single-Mode Optical Fiber, filed Nov. 6, 2008, (de Montmorillon et al.); U.S. Patent Application No. 61/112,374 for a Bend-Insensitive Single-Mode Optical Fiber, filed Nov. 7, 2008, (de Montmorillon et al.).

One exemplary glass fiber, for instance, possesses a step-index core having a refractive index that is between about 0.003 and 0.006 higher than the refractive index of its adjacent silica cladding.

Exemplary single-mode glass fibers for use in the present invention are commercially available from Draka Comteq (Claremont, N.C.) under the trade name BendBright®, which is compliant with the ITU-T G.652.D requirements, and the trade name BendBright$^{XS}$®, which is compliant with the ITU-T G.657.A/B and ITU-T G.652.D requirements.

In particular and as set forth herein, it has been unexpectedly discovered that the pairing of a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011) achieves optical fibers having exceptionally low losses (e.g., reductions in microbend sensitivity of at least 10× (e.g., 40× to 100× or more) as compared with a single-mode fiber employing a conventional coating system). Draka Comteq's bend-resistant, single-mode glass fiber available under the trade name BendBright$^{XS}$® employs a trench-assisted design that reduces microbending losses.

FIG. 1 depicts this outstanding result by comparing the aforementioned exemplary single-mode fiber according to the present invention with various single-mode fibers employing conventional coating systems. In this regard, FIG. 1 presents spectral attenuation data by measuring initial spectral attenuation on the optical fiber on a shipping spool, thereby obtaining the peaks and valleys typical of the attenuation across the full spectrum of wavelengths between the limits shown. The optical fiber is then wound onto a sandpaper-covered, fixed-diameter drum (i.e., measurement spool) as described by the IEC fixed-diameter sandpaper drum test (i.e., IEC TR62221, Method B), and another spectral attenuation curve is obtained.

The IEC fixed-diameter sandpaper drum test (i.e., IEC TR62221, Method B) provides a microbending stress situation that affects single-mode fibers even at room temperature.

The sandpaper, of course, provides a rough surface that subjects the optical fiber to thousands, if not millions, of stress points. With respect to the test data presented in FIG. 1, a 300-mm diameter fiber spool was wrapped with adhesive-backed, 40-micron grade sandpaper (i.e., approximately equivalent to 300-grit sandpaper) to create a rough surface. Then, 400-meter fiber samples were wound at about 2,940 mN (i.e., a tension of 300 gf on a 300-mm diameter cylinder), and spectral attenuation was measured at 23° C.

The curves presented in FIG. 1 represent the difference between the initial spectral curve and the curve when the fiber is on the sandpaper drum, thereby providing the added loss due to microbending stresses.

Those having ordinary skill in the art will recognize cable designs are now employing smaller diameter buffer tubes and less expensive materials in an effort to reduce costs. Consequently, when deployed in such cable designs, single-mode optical fibers are less protected and thus more susceptible to stress-induced microbending. As noted, the present invention provides an improved coating system that better protects optical fibers against stresses caused by external mechanical deformations and by temperature-induced, mechanical property changes to the coatings.

As noted, conventional solutions for protecting optical fibers involved using large-diameter buffer tubes, buffer tubes made of high-modulus materials that resist deformation and stresses upon the fiber, and stronger, thicker cable jackets to resist deformations that might pinch or otherwise squeeze the optical fibers. These solutions, however, are not only costly, but also fail to address the temperature-induced stresses caused by changes to the protective coatings. In other words, conventional primary coatings possess high modulus at temperatures below their respective glass transition temperatures.

As disclosed herein, the optical fiber according to the present invention includes a primary coating possessing lower modulus and lower glass transition temperature than possessed by conventional single-mode fiber primary coatings. Even so, the improved primary coating formulation nonetheless facilitates commercial production of the present optical fiber at excellent processing speeds (e.g., 1,000 m/min or more). In this regard, the primary coating employed in the optical fibers of the present invention possesses fast curing rates—reaching 50 percent of full cure at a UV dose of about 0.3 J/cm$^2$, 80 percent of full cure at a UV dose of about 0.5 J/cm$^2$, and 90 percent of full cure at a UV dose of about 1.0 J/cm$^2$ as measured on a standard 75-micron film at 20° C. and atmospheric pressure (i.e., 760 ton) (i.e., standard temperature and pressure—STP).

Figure 2:
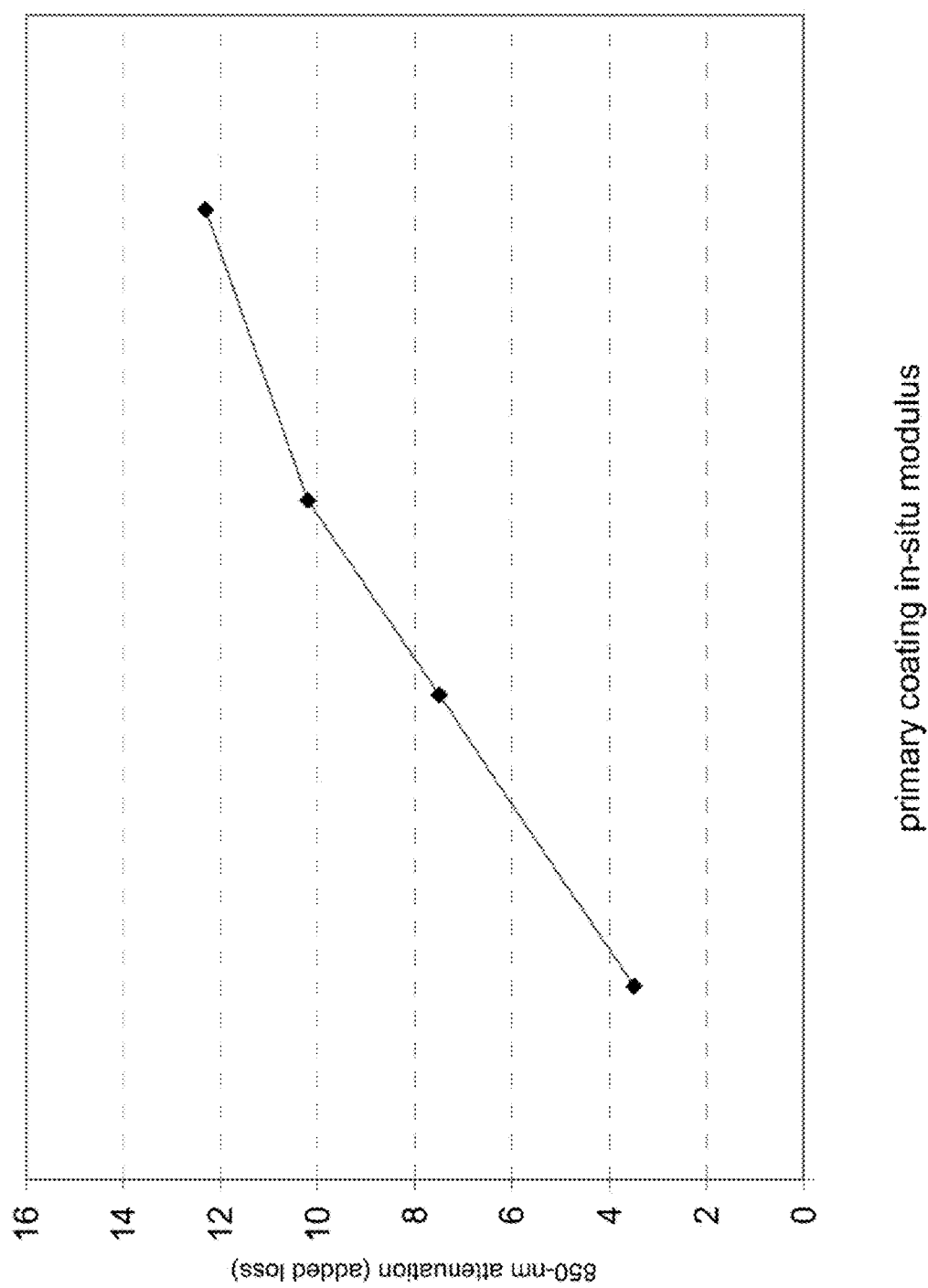
FIG. 2 schematically depicts the relationship between the in situ modulus of a primary coating and added loss for a multimode optical fiber.

FIG. 2 schematically depicts the observed relationship between the in situ modulus of a primary coating and the attenuation (added loss) of the optical fiber, here a 50-micron graded-index multimode fiber. The primary coating modulus is measured as cured on the glass fiber and the added loss is measured using a fixed-diameter sandpaper drum procedure in accordance with the IEC TR62221 microbending-sensitivity technical report and standard test procedures (e.g., IEC TR62221, Method B, Ed. 1), which are hereby incorporated by reference in their entirety.

As will be appreciated by those having ordinary skill in the art, prior, commercially available single-mode fibers typically include a Young's modulus of 100-150 psi measured in situ (i.e., on the fiber). The optical fiber according to the present invention possesses a primary coating having reduced modulus as compared with such commercially available primary coatings. Employing a lower modulus primary coating provides better cushioning around the glass fiber.

Although lower modulus of the in situ primary coating can be achieved by selectively undercuring, the present invention achieves in situ primary coating having lower modulus even approaching full cure (i.e., near full cure). In this regard, the modulus of the in situ primary coating according to the present invention is less than about 0.65 MPa (e.g., less than about 95 psi), typically less than about 0.5 MPa, and more typically less than 0.4 MPa (e.g., between about 0.3 MPa and 0.4 MPa or between about 40 psi and 60 psi). It has been determined that an in situ primary coating having a modulus of less than about 0.5 MPa significantly reduces bend sensitivity of the glass fiber. On the other hand, the modulus of the in situ primary coating according to the present invention is typically greater than about 0.2 MPa (e.g., 0.25 MPa or more).

To achieve its reduced modulus as compared with conventional optical fiber coatings, the present primary coating possesses a lower crosslink density, specifically a reduced concentration of the reactive acrylate groups. Those having ordinary skill in the art will appreciate that acrylate groups crosslink via free radical polymerization during photoinitiation (e.g., UV-induced curing during drawing operations). The reaction kinetics dictate reduced cure rates during processing. This is commercially undesirable, of course, and so the present invention implements processing modifications to provide satisfactory cure rate for the low-modulus primary coating.

There are at least two components of the curing process that retard the rate of polymerization of the primary coating. First, the combination of (i) high curing temperatures induced by exposure to a high-intensity, UV environment and (ii) the exothermic polymerization reaction slows the observed curing rate of the primary coating. Second, close proximity of stacked UV lamps, in effect, creates rapidly superposed, repeated photoinitiation periods. The reaction rate of acrylate groups under this configuration is likewise retarded—a somewhat counterintuitive result. With respect to the latter, disposing (i.e., positioning) UV lamps to increase the period between consecutive UV exposures significantly increases the degree of coating cure as compared with other conventional processes employing the same draw speed and UV dose. In this way, it is possible to process the reduced-modulus, primary coating according to the present invention in a way that achieves near-complete curing at fast fiber draw speeds, which are required for a commercially viable process. An exemplary method and apparatus for curing a coated fiber is disclosed in commonly assigned U.S. Pat. No. 7,322,122, which is hereby incorporated by reference in its entirety.

The temperature dependence of the modulus is an important consideration to ensure that the primary coating provides enhanced microbending protection in FTTx applications. A primary coating having low modulus only at room temperature would be inadequate because deployment in the field will expose the optical fiber to microbend-inducing stresses at extreme environmental temperatures (e.g., −40° C. and below). Therefore, a suitable primary coating according to the present invention possesses an exceptionally low glass transition temperature so that the primary coating remains soft and protective in extremely cold environmental conditions.

EXAMPLE 1

Comparison of Mechanical Properties

Figure 3:
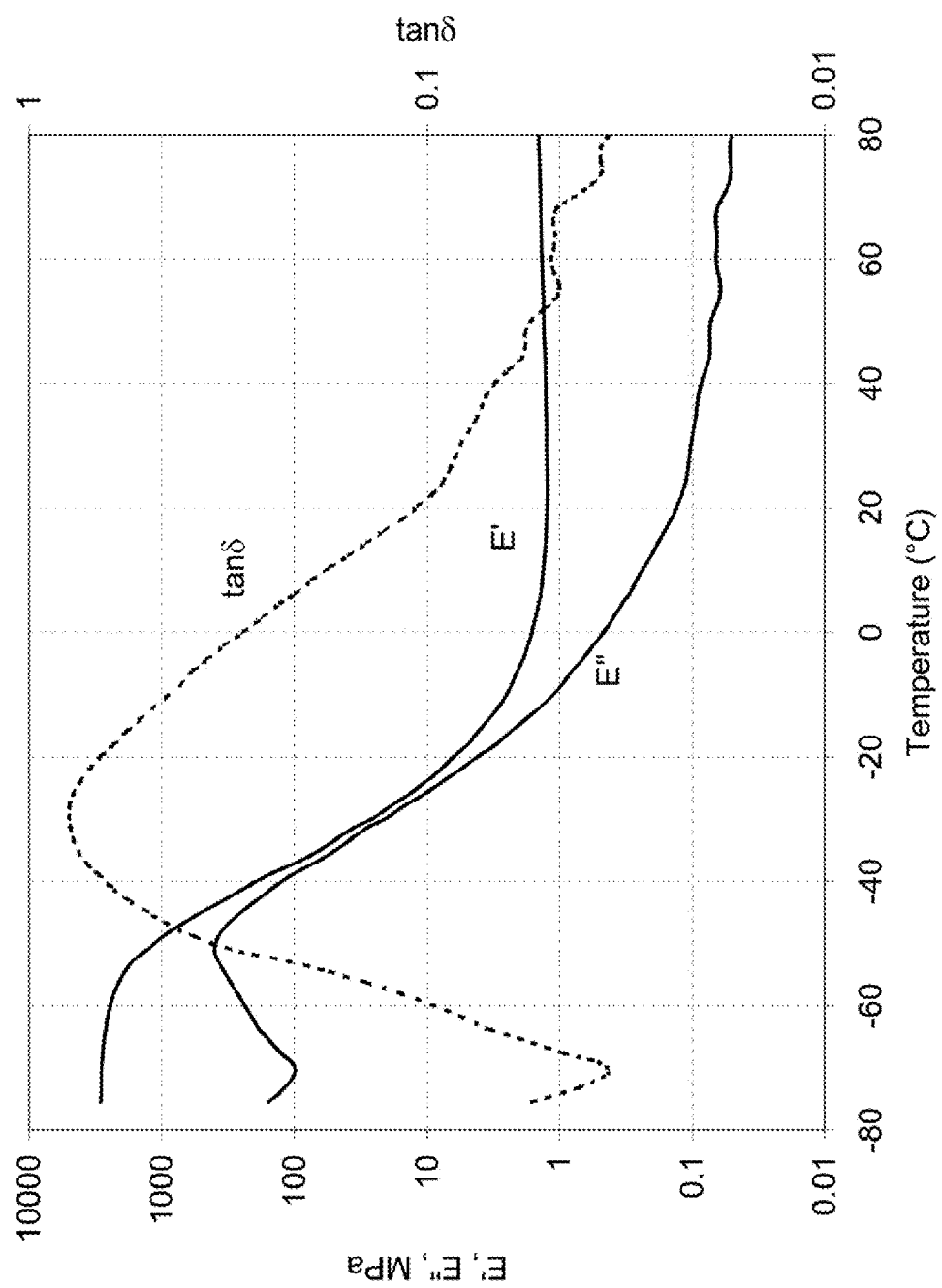
FIG. 3 depicts the dynamic mechanical properties of a typical commercial primary coating (i.e., a conventional primary coating).
Figure 4:
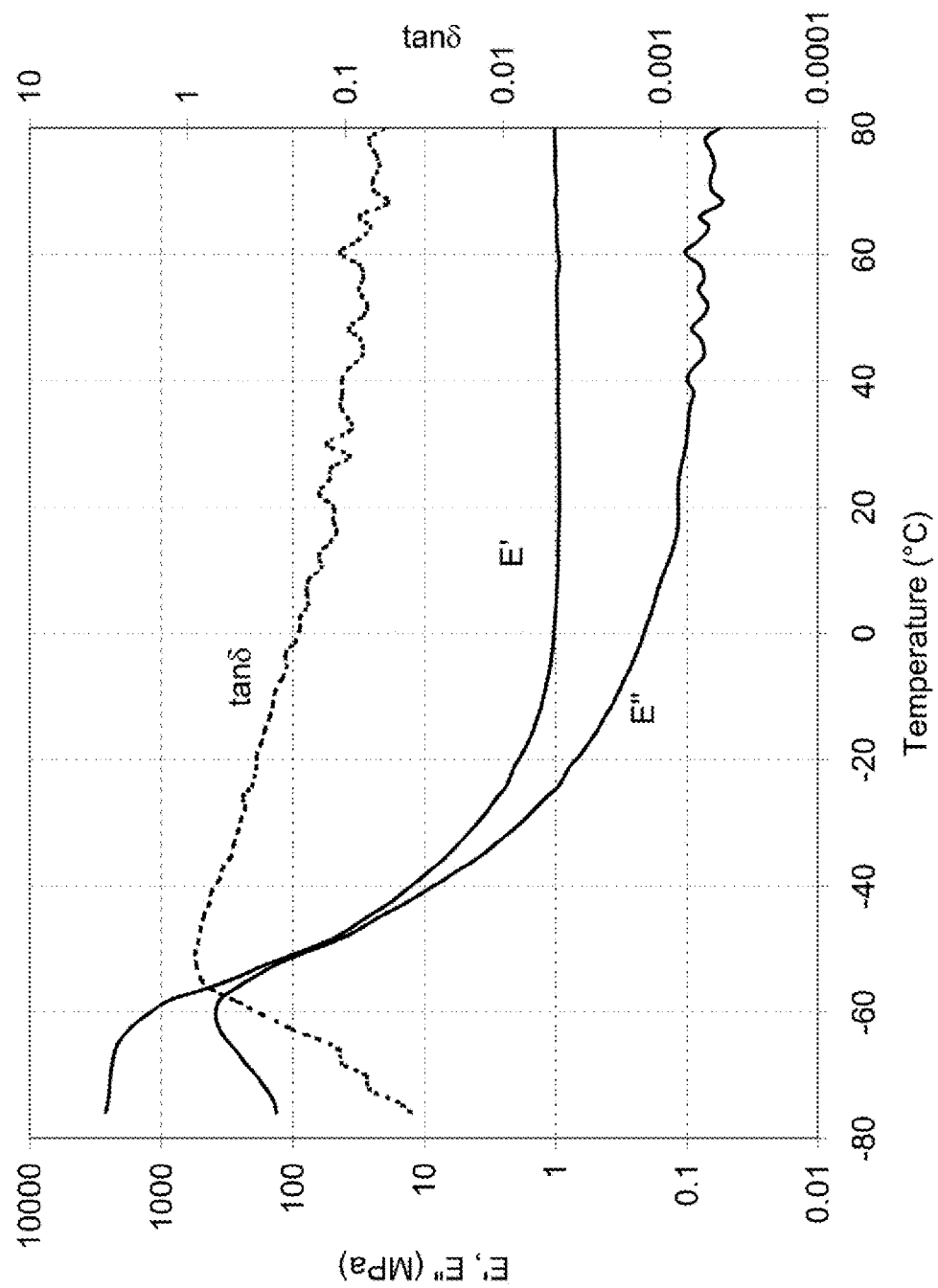
FIG. 4 depicts the dynamic mechanical properties of an exemplary primary coating used in producing optical fibers according to the present invention.

FIGS. 3 and 4, respectively, depict dynamic mechanical properties of a typical commercial primary coating (i.e., the conventional primary coating) and an exemplary primary coating used in making the optical fibers according to the present invention. The conventional primary coating was a UV-curable urethane acrylate provided by DSM Desotech (Elgin, Ill.) under the trade name DeSolite® DP 1007. The exemplary primary coating according to the present invention (i.e., employed to form optical fibers of the present invention) was a UV-curable urethane acrylate provided by DSM Desotech (Elgin, Ill.) under the trade name DeSolite® DP 1011.

The data for the conventional primary coating were obtained on a Dynamic Mechanical Analyzer (DMA) at an oscillatory stress rate of 1 Hz. In doing so, the strain was maintained within the linear region of stress-strain behavior. The sample of conventional primary coating was cured on polyester to form a standard 75-micron film. A UV dose of 1 J/cm$^2$ was applied using a mercury-halide bulb operating at a 300 W/in output. This UV exposure was sufficient to ensure that the coating was on the plateau of the dose-modulus curve.

Referring to FIG. 3, the data show the equilibrium modulus to be approximately 1.5 MPa as measured on a 75-micron film. On a glass fiber (i.e., in situ), this conventional primary coating typically cures well to a modulus of about 0.8 MPa, a level indicative of many single-mode fiber primary coatings in the industry. Those having ordinary skill in the art will appreciate that modulus measurements of softer primary coatings tend to be lower on a glass fiber (i.e., in situ) as compared with on a 75-micron film.

The glass transition temperature of the conventional primary coating is estimated by the peak in tans to be approximately −30° C. Thus, the conventional primary coating (and similar formulations) will behave like a glassy polymer at extremely low temperatures (e.g., less than −40° C., particularly less than −50° C.). (Although stress induced by strain is time dependent at low temperatures, estimated glass transition temperature is a useful comparative property.)

A sample of the exemplary primary coating according to the present invention was likewise cured on polyester to form a comparable 75-micron film. As before, a UV dose of 1 J/cm$^2$ was applied to the primary coating using a mercury-halide bulb operating at a 300 W/in output. As noted, FIG. 4 depicts dynamic mechanical properties of the exemplary primary coating according to the present invention.

The exemplary primary coating according to the present invention exhibited an equilibrium modulus at just under 1 MPa in the cured film. The in situ modulus (i.e., measured on the glass fiber), was between about 0.3 MPa and 0.4 MPa. This is significantly lower than the respective modulus measurements for the conventional primary coating.

The glass transition temperature of the exemplary primary coating according to the present invention is estimated by the peak in tans at less than about −50° C. (e.g., about −60° C.). This is at least about 20° C. below the glass transition temperature of the comparative, conventional primary coating. Accordingly, primary coatings according to the present invention provide much more rapid stress relaxation during temperature excursions.

As set forth in Examples 2 and 3 (below), two different methods were used to evaluate the respective microbend sensitivities of glass fibers coated with (i) a typical commercial primary coating (i.e., the conventional primary coating) and (ii) an exemplary primary coating according to the present invention. As with Example 1 (above), the conventional primary coating was a UV-curable urethane acrylate provided by DSM Desotech (Elgin, Ill.) under the trade name DeSolite® DP 1007, and the exemplary primary coating according to the present invention (i.e., employed to form optical fibers of the present invention) was a UV-curable urethane acrylate provided by DSM Desotech (Elgin, Ill.) under the trade name DeSolite® DP 1011.

Each test method provided aggravated lateral stress conditions. Moreover, after measuring the effect on attenuation at room temperature, the test structures were temperature cycled to determine the additional loss induced by such temperature excursions.

EXAMPLE 2

Comparison of Microbending Sensitivity

The first test method employed was a basket-weave, temperature cycling procedure known by those having ordinary skill in the art. According to this test procedure, optical fiber was wound at about 490 mN (i.e., a tension of 50 gf on a 300-mm diameter quartz cylinder with a 9-mm "lay"). Fifty layers were wound on the quartz drum to create numerous fiber-to-fiber crossovers. The testing procedure for Example 2 was an adaptation of IEC TR62221, Method D, which, as noted, is incorporated by reference in its entirety.

Those having ordinary skill in the art will appreciate that, at room temperature, such fiber crossovers can sometimes cause added loss (i.e., if the optical fiber is very sensitive) but that typically little or no added loss is observed. Consequently, the drum (with wound fiber) was temperature cycled twice from about room temperature through (i) −40° C., (ii) −60° C., (iii) +70° C., and (iv) +23° C. (i.e., near room temperature) while making loss measurements at 1550 nanometers. In both temperature cycles, fiber attenuation was measured after one hour at each test temperature.

Figure 5:
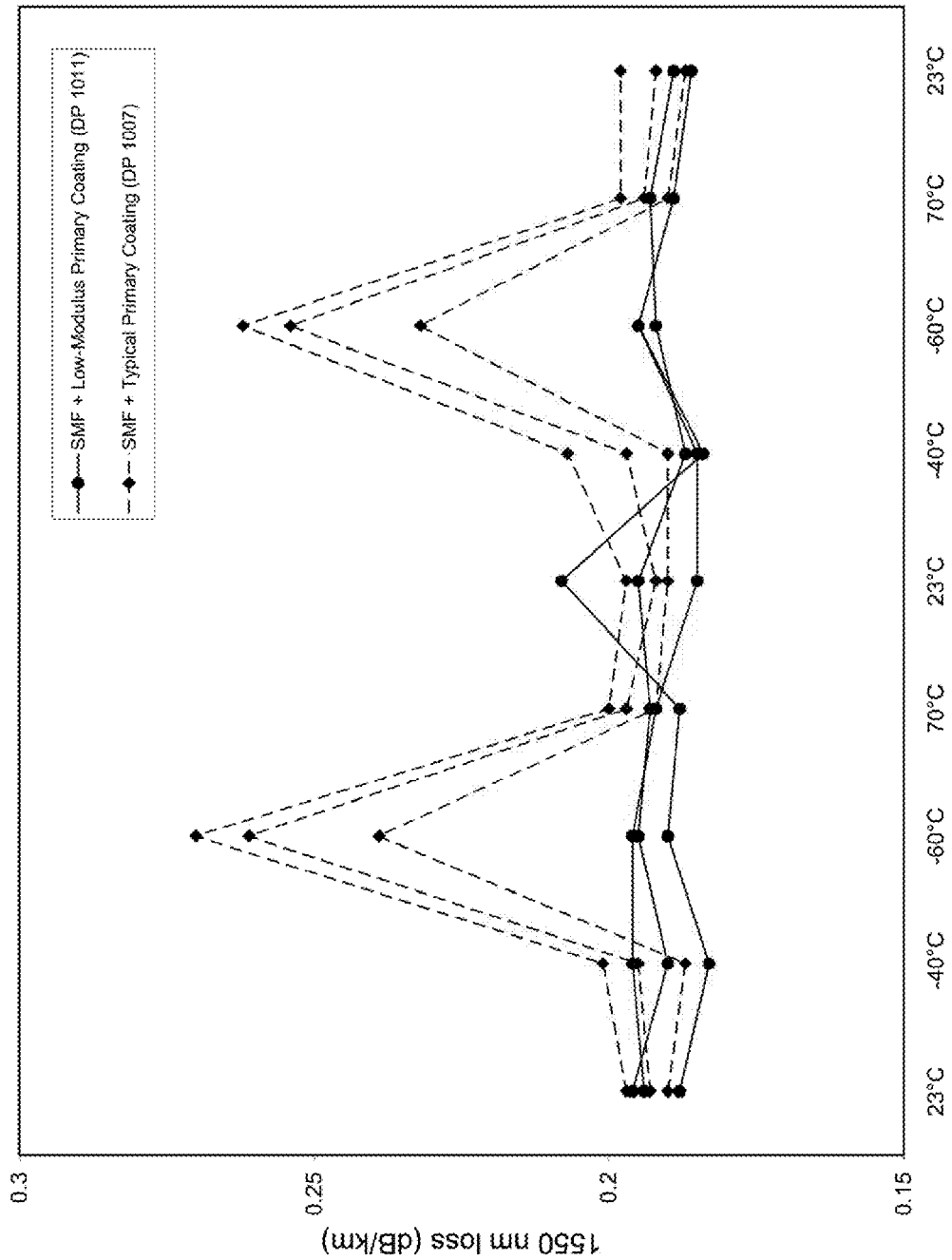
FIG. 5 depicts microbend testing results for optical fibers that include a conventional primary coating and for optical fibers that include an exemplary primary coating according to the present invention.

FIG. 5 depicts exemplary results for single-mode glass fibers coated with, respectively, a conventional primary coating (i.e., DeSolite® DP 1007) and an exemplary primary coating according to the present invention (i.e., DeSolite® DP 1011). The respective fiber specimens were chosen to match the coating geometry, mode field diameter, and cutoff wavelength. Accordingly, the respective optical fibers employed different formulations of colored secondary coatings.

In summary, the conventional primary coating and the exemplary primary coating according to the present invention each provided good protection against microbending stresses at 23° C. Moreover, at −40° C., the optical fiber having the conventional primary coating demonstrated only a small added loss. (It would appear that at −40° C., the conventional primary coating provided adequate protection against microbending by stress relaxing in a reasonable timeframe, even though this was near its glass transition temperature.) By way of comparison, the optical fiber according to the present invention demonstrated essentially no added loss at −40° C. (i.e., better performance).

At −60° C., however, the optical fiber having the conventional primary coating demonstrated significant added loss. (This temperature extreme was well below the glass transition temperature of the conventional primary coating.) By way of comparison, the optical fiber according to the present invention demonstrated essentially no added loss at −60° C., which is close to the glass transition temperature of this embodiment of the primary coating according to the present invention.

EXAMPLE 3

Comparison of Microbending Sensitivity

The second test method employed more aggressive environments (i.e., conditions) in order to evaluate the respective microbend sensitivities of (i) an optical fiber possessing a typical commercial primary coating (i.e., the conventional primary coating) and (ii) an optical fiber possessing an exemplary primary coating according to the present invention.

In particular, the second method modified the IEC fixed-diameter sandpaper drum test (i.e., IEC TR62221, Method B), which, as noted, is incorporated by reference in its entirety, to provide a microbending stress situation sufficiently harsh to affect single-mode fibers even at room temperature (i.e., a rougher drum surface than that used to measure the data depicted in FIG. 1). To do this, a 300-mm diameter quartz drum was wrapped with adhesive-backed, 220-grit sandpaper (i.e., approximately equivalent to 66-micron-grade sandpaper) to create a rough surface.

In an initial test condition, each of the respective fiber samples was wound in a single layer at about 980 mN (i.e., a tension of 100 gf on a 300-mm diameter quartz cylinder). In a modified test condition, three (3) each of the respective fiber samples was wound in a single layer at about 1,470 mN (i.e., a tension of 150 gf on a 300-mm diameter quartz cylinder). Thus, as compared with the first test condition, the second test condition increased the winding tension by 50 percent.

Using matched fiber samples (as with the basket weave/temperature cycling test of Example 2) fiber attenuation was measured after winding at room temperature (i.e., 23° C.) for each test condition. Then, the drum (with 400 meters of wound fiber) was temperature cycled from about room temperature through (i) −40° C., (ii) −60° C., and (iii) +23° C. (i.e., near room temperature) while making loss measurements at 1550 nanometers using an optical time domain reflectometer (OTDR).

The several samples of each kind of optical fiber were initially measured at 23° C. on the original spools (i.e., before winding on the roughened drum surface to establish baseline spectral attenuation) then were subjected to the foregoing rigorous testing conditions for one hour at each temperature. Fiber attenuation was measured after one hour (as in Example 2) at each test temperature.

Figure 6:
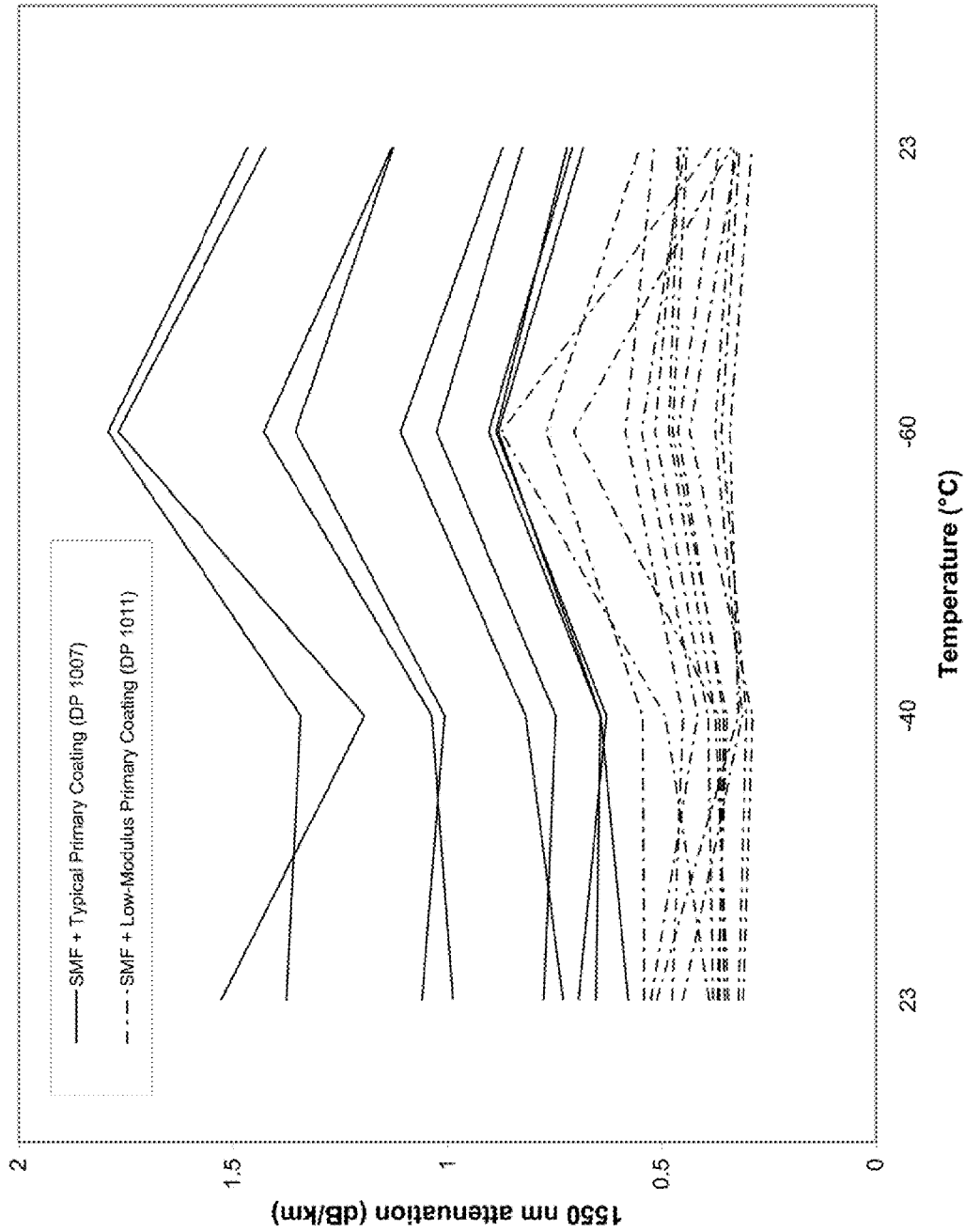
FIG. 6 depicts microbend testing results (under rigorous temperature-cycle testing conditions) for optical fibers that include a conventional primary coating and for optical fibers that include an exemplary primary coating according to the present invention.
Figure 7:
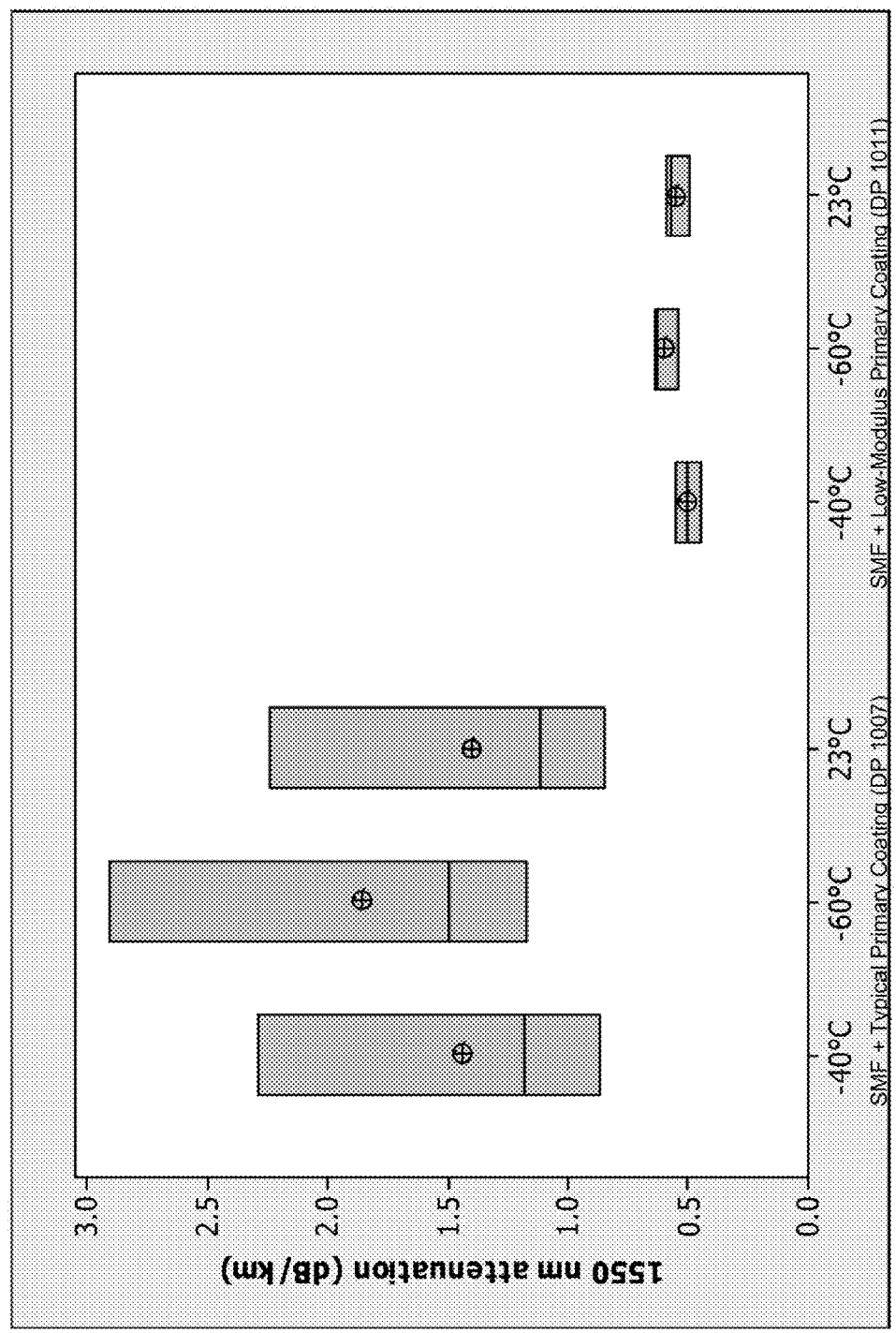
FIG. 7 depicts microbend testing results (under modified temperature-cycle testing conditions) for optical fibers that include a conventional primary coating and for optical fibers that include an exemplary primary coating according to the present invention.

FIG. 6, a line chart, and FIG. 7, a box plot, depict exemplary results under these more rigorous testing conditions for single-mode optical fibers that include a conventional primary coating (i.e., DeSolite® DP 1007 UV-curable urethane acrylate) and for single-mode optical fibers that include an exemplary primary coating according to the present invention (i.e., DeSolite® DP 1011 UV-curable urethane acrylate).

FIG. 6, for instance, shows that, as compared with conventional optical fibers, exemplary optical fibers according to the present invention possess reduced microbend sensitivity (i.e., a reduction of about 40-60 percent).

Likewise, FIG. 7 shows that, as compared with conventional optical fibers, exemplary optical fibers according to the present invention possess substantially reduced microbend sensitivity at a higher winding tension (i.e., 150 gf on a 300-mm diameter quartz cylinder). FIG. 7 thus illustrates that the exemplary primary coating according to the present invention (i.e., DeSolite® DP 1011 UV-curable urethane acrylate) promotes both significantly reduced and significantly more uniform microbending performance.

In accordance with the foregoing, it has been found that, as compared with a conventional coating system, the present coating system provides significant microbending improvement when used in combination with a conventional single-mode glass fiber.

It has been further found that pairing a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011) achieves optical fibers having exceptionally low losses. Additional testing was performed, therefore, to demonstrate the dramatic and unexpected reductions in microbend sensitivity provided in accordance with the present invention.

EXAMPLE 4

Comparison of Microbending Sensitivity

The respective microbend sensitivities were measured for exemplary optical fibers, including (i) a conventional single-mode glass fiber with a conventional commercial coating, (ii) a bend-insensitive glass fiber with a conventional commercial coating, and (iii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

Figure 8:
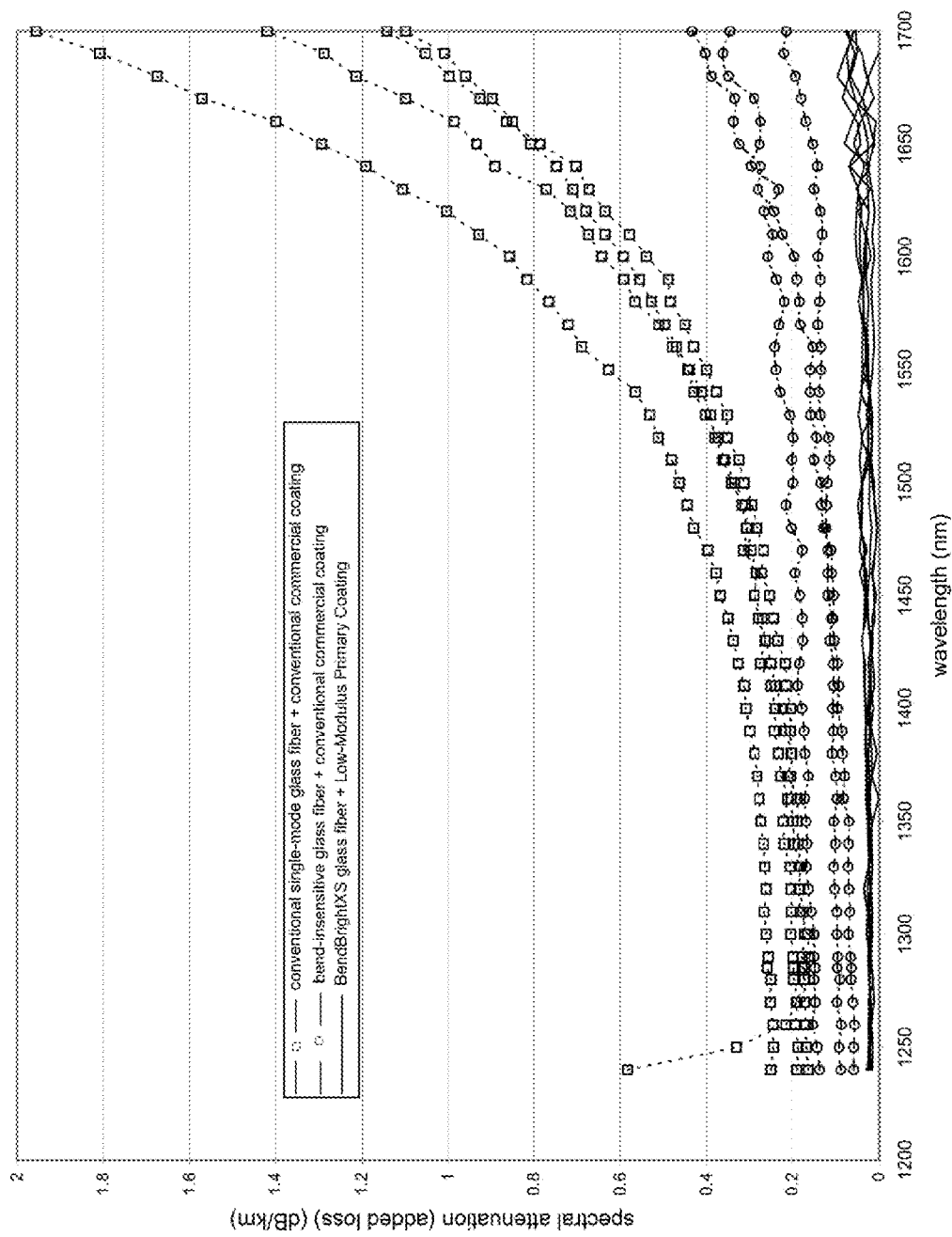
FIG. 8 depicts microbend testing results demonstrating that exceptionally low microbending losses are achieved, in accordance with the present invention, by pairing a bend-insensitive glass fiber with a low-modulus primary coating.

FIG. 8 demonstrates that the optical fiber according to the present invention, namely including a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011), provides exceptionally low attenuation losses as compared with other optical fibers. Moreover, this bend-resistant optical fiber exhibits small wavelength dependence within the transmission window between 1400 nanometers and 1700 nanometers, and is essentially unaffected by the microbend-inducing test conditions across the test spectrum.

FIG. 8 presents exemplary spectral attenuation data obtained adhering to IEC TR62221, Method B (fixed-diameter drum). In accordance with IEC TR62221, Method B, initial spectral attenuation was measured on a 440-meter sample of optical fiber wound on a shipping spool (i.e., obtaining the peaks and valleys typical of the attenuation across the full spectrum of wavelengths between the limits shown). The optical fiber was then wound at about 3 N onto a 300-mm diameter measurement spool wrapped with adhesive-backed, 40-micron grade sandpaper (i.e., approximately equivalent to 300-grit sandpaper), and another spectral attenuation curve was obtained.

Like the curves presented in FIG. 1, the curves depicted in FIG. 8 represent, at 23° C., the difference between the initial spectral curve and the curve when the fiber is on the sandpaper drum of fixed diameter, thereby providing the added loss due to microbending stresses (i.e., delta-attenuation across the spectral range).

EXAMPLE 5

Comparison of Microbending Sensitivity

The respective microbend sensitivities were measured under rigorous test conditions for exemplary optical fibers, including (i) a conventional single-mode glass fiber with a conventional commercial coating and (ii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

Figure 9:
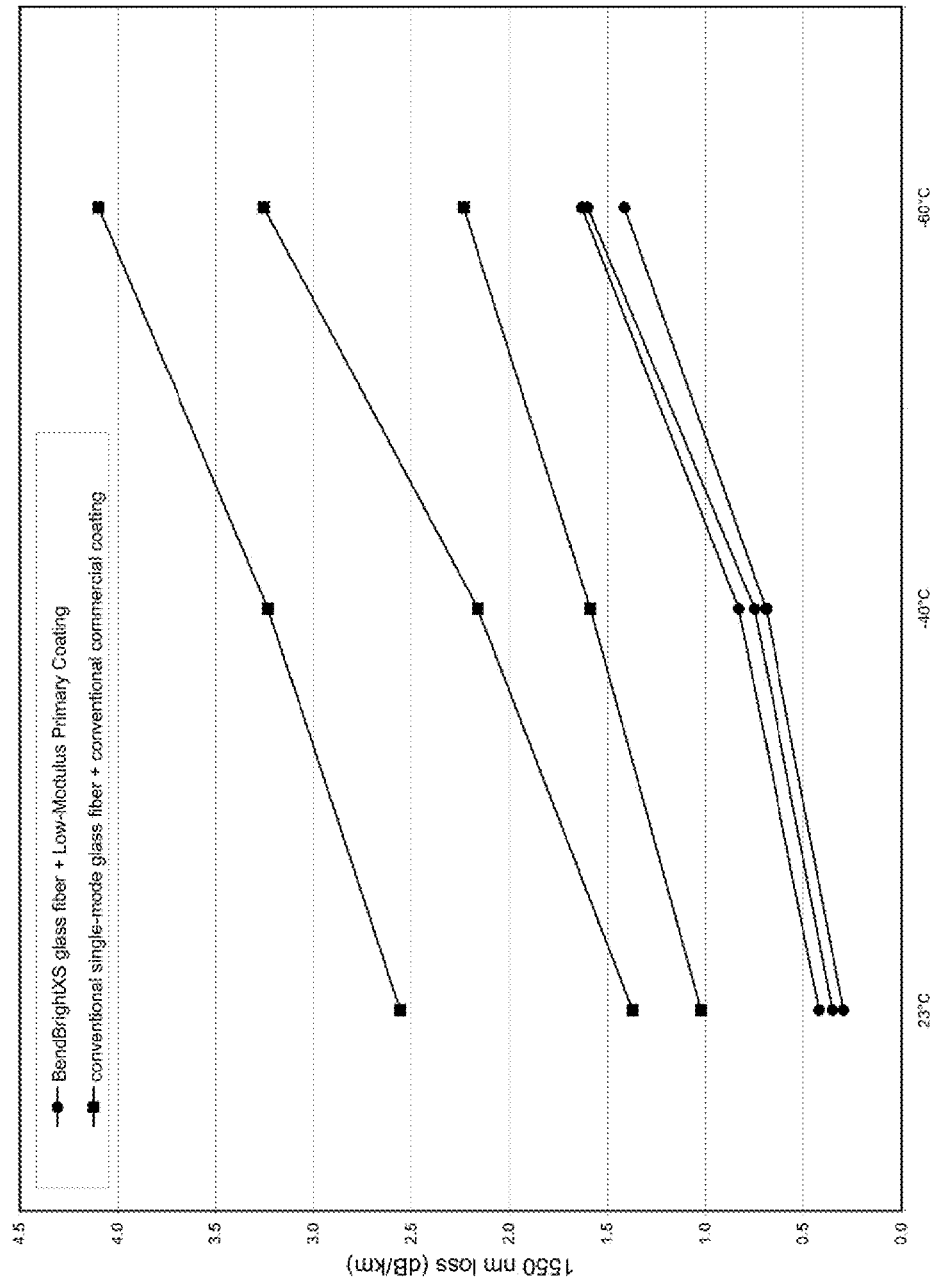
FIG. 9 depicts microbend testing results (under rigorous temperature-cycle testing conditions) for conventional optical fibers and for optical fibers that, in accordance with the present invention, combine a bend-insensitive glass fiber with a low-modulus primary coating.

FIG. 9 demonstrates that, even under extremely harsh conditions, the optical fiber according to the present invention, namely including a bend-insensitive glass fiber (e.g., Draka Comteq's single-mode glass fibers available under the trade name BendBright$^{XS}$®) and a primary coating having very low modulus (e.g., DSM Desotech's UV-curable urethane acrylate product provided under the trade name DeSolite® DP 1011), provides surprisingly low attenuation losses as compared with other optical fibers.

The testing procedure for Example 5 was an adaptation of IEC TR62221, Method B, which, as noted, is incorporated by reference in its entirety. For this modified IEC fixed-diameter sandpaper drum test, a 300-mm diameter quartz drum was wrapped with adhesive-backed, 180-grit sandpaper (i.e., approximately equivalent to 78-micron-grade sandpaper) to create an even rougher surface than that described in Example 3 (above). Then, 440-meter fiber samples were wound in a single layer at about 1,470 mN (i.e., a controlled back tension of 150 gf on the 300-mm diameter quartz cylinder using a Delachaux optical fiber winding apparatus), and spectral attenuation was measured.

FIG. 9 presents exemplary temperature-cycle data for three specimens of standard single-mode fiber (i.e., a conventional single-mode glass fiber with a conventional commercial coating) and three specimens of optical fiber according to the present invention (i.e., a bend-insensitive glass fiber with improved coating according to the present invention). As noted, 440 meters of optical fiber is wound onto the aforementioned sandpaper-covered, fixed-diameter drum. One hour after winding, fiber attenuation was measured at room temperature (i.e., 23° C.) using an optical time domain reflectometer (OTDR). Then, the drum (with 440 meters of wound fiber) was temperature cycled from about room temperature through (i) −40° C. and (ii) −60° C. in a temperature-controlled chamber. Fiber attenuation at 1550 nanometers was measured by an OTDR after one hour of equilibration at both −40° C. and −60° C.

Microbending sensitivity ($S_m$) may be described as $\alpha R/T$, wherein $\alpha$ is the attenuation increase on the drum (dB/km), R is the radius of the fixed drum (mm), and T is the winding tension applied to the fiber (N). See e.g., IEC TR62221 Technical Report (Microbending Sensitivity). In addition to the parameters $\alpha$, R, and T, however, the microbending-sensitivity metric obtained from the fixed-diameter sandpaper drum test is dependent on the coarseness of the sandpaper employed on the measurement drum.

Table 1 (below) presents the microbending-sensitivity metric obtained from the attenuation data (at a wavelength of 1550 nanometers) depicted in FIG. 9 (i.e., employing 180-grit sandpaper). Table 1 shows that, as compared with a conventional standard single-mode fiber, the optical fiber according to the present invention provides microbending sensitivity that is about 2×-10× lower at 23° C. and about 2×-5× lower at −40° C.:

TABLE 1

(Microbend Sensitivity)

| Optical Fiber (Coating Color) | 23° C. (dB/km)/ (N/mm) | −40° C. (dB/km)/ (N/mm) | −60° C. (dB/km)/ (N/mm) |
|---|---|---|---|
| Conventional SMF (blue) | 139.9 | 220.6 | 331.8 |
| Conventional SMF (red) | 261.0 | 329.7 | 417.9 |
| Conventional SMF (aqua) | 104.3 | 161.9 | 228.0 |
| BendBright$^{XS}$ ® w/ ColorLock$^{XS}$ (slate) | 35.8 | 76.5 | 163.4 |
| BendBright$^{XS}$ ® w/ ColorLock$^{XS}$ (red) | 30.1 | 70.6 | 144.2 |

TABLE 1-continued (Microbend Sensitivity)

| Optical Fiber (Coating Color) | 23° C. (dB/km)/ (N/mm) | −40° C. (dB/km)/ (N/mm) | −60° C. (dB/km)/ (N/mm) |
| --- | --- | --- | --- |
| BendBright$^{XS}$ ® w/ ColorLock$^{XS}$ (aqua) | 42.7 | 84.7 | 166.4 |

EXAMPLE 6

Comparison of Microbending Sensitivity

The respective microbend sensitivities were further measured for exemplary optical fibers, including (i) a conventional single-mode glass fiber with a conventional commercial coating and (ii) a bend-insensitive glass fiber (e.g., Draka Comteq's single-mode glass fibers available under the trade name BendBright$^{XS}$®) with the coating according to the present invention (e.g., Draka Comteq's ColorLock$^{XS}$ brand coating system).

The testing procedure for Example 6 was an adaptation of IEC TR62221, Method B, which, as noted, is incorporated by reference in its entirety. For this modified IEC fixed-diameter sandpaper drum test, a 300-mm diameter quartz drum was wrapped with adhesive-backed, 220-grit sandpaper (i.e., approximately equivalent to 66-micron-grade sandpaper) to create a rough surface like that described in Example 3. Each of the fiber samples was wound in a single layer at about 1,470 mN (i.e., a tension of 150 gf on a 300-mm diameter quartz cylinder). As compared with the test conditions of Example 5, the test conditions of Example 6 employed finer grade sandpaper (i.e., 220-grit rather than 180-grit).

As in Example 3, using matched fiber samples, fiber attenuation was measured after winding at room temperature (i.e., 23° C.). Then, the drum (with about 400 meters of wound fiber) was temperature cycled from about room temperature through (i) −40° C., (ii) −60° C., and (iii) +23° C. (i.e., near room temperature) while making loss measurements at 1550 nanometers using an optical time domain reflectometer (OTDR).

Three (3) samples of each kind of optical fiber were initially measured at 23° C. on the original spools (i.e., before winding on the roughened drum surface to establish baseline spectral attenuation) and then were subjected to the foregoing rigorous testing conditions for one hour at each temperature. Fiber attenuation was measured after one hour at each temperature.

Figure 10:
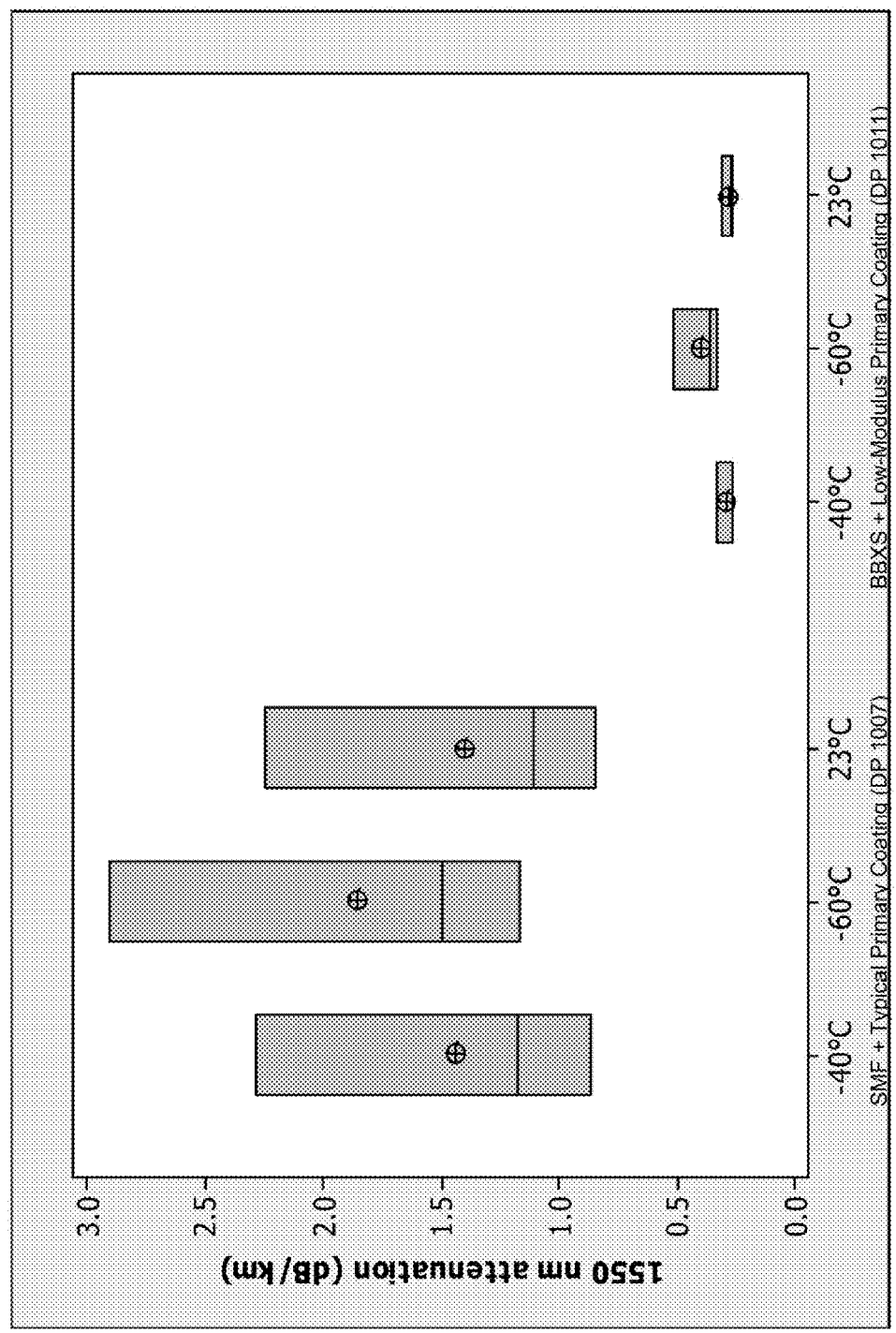
FIG. 10 depicts microbend testing results (under modified temperature-cycle testing conditions) for conventional optical fibers and for optical fibers that, in accordance with the present invention, combine a bend-insensitive glass fiber with a low-modulus primary coating.

FIG. 10 depicts exemplary results for single-mode optical fibers that include a conventional primary coating (i.e., DeSolite® DP 1007 UV-curable urethane acrylate) and for bend-insensitive glass fibers (e.g., Draka Comteq's single-mode glass fibers available under the trade name BendBright$^{XS}$®) that include a primary coating having very low modulus (i.e., DSM Desotech's UV-curable urethane acrylate product provided under the trade name DeSolite® DP 1011).

FIG. 10 demonstrates that the optical fiber according to the present invention, namely Draka Comteq's single-mode glass fibers available under the trade name BendBright$^{XS}$® with a primary coating having very low modulus (e.g., DSM Desotech's UV-curable urethane acrylate product provided under the trade name DeSolite® DP 1011), provides exceptionally low attenuation losses as compared with standard single-mode optical fibers (SSMF).

Figure 11:
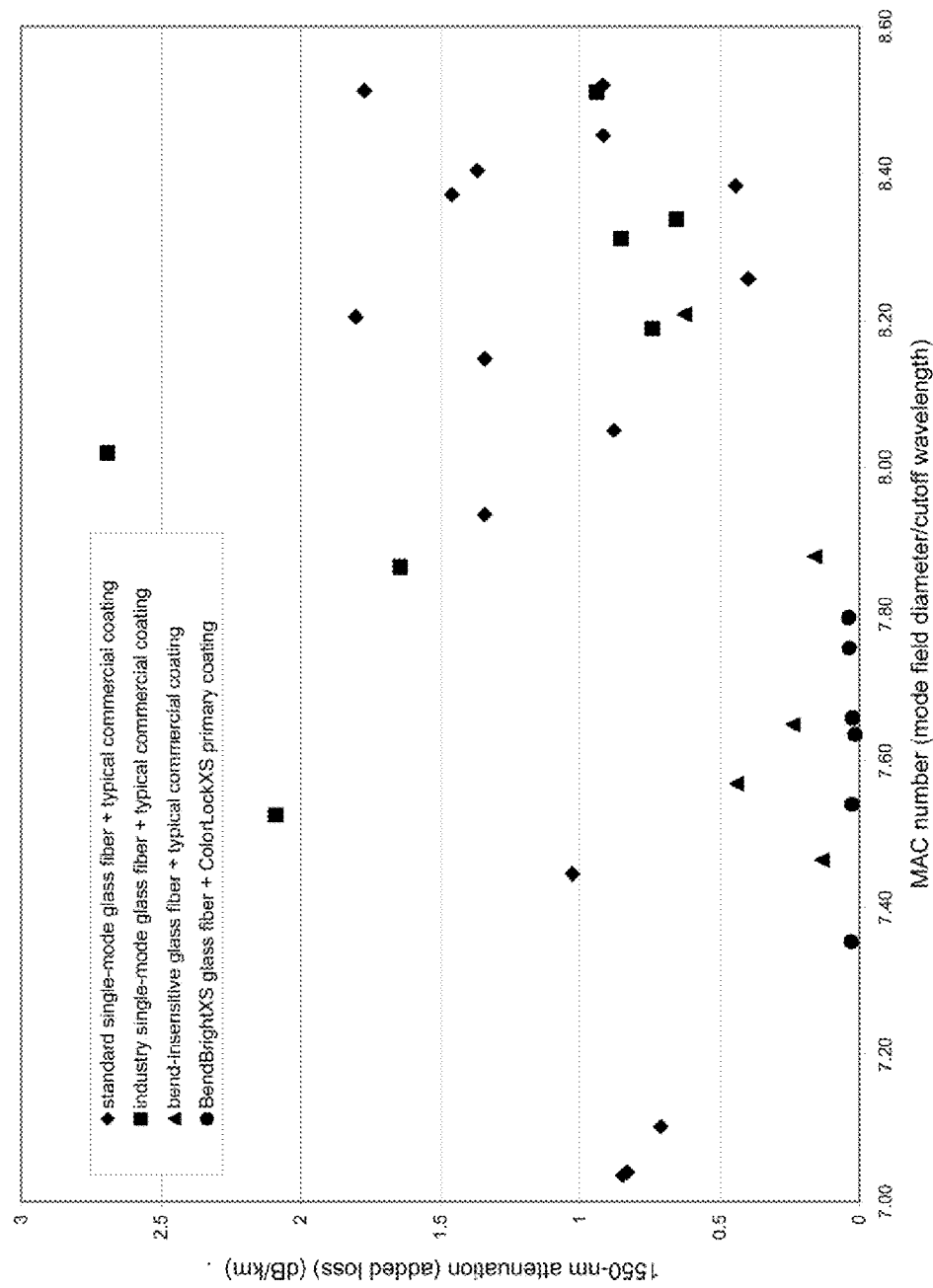
FIG. 11 depicts attenuation (added loss) as a function of MAC number (i.e., mode field diameter divided by cutoff wavelength) for various exemplary optical fibers.
Figure 12:
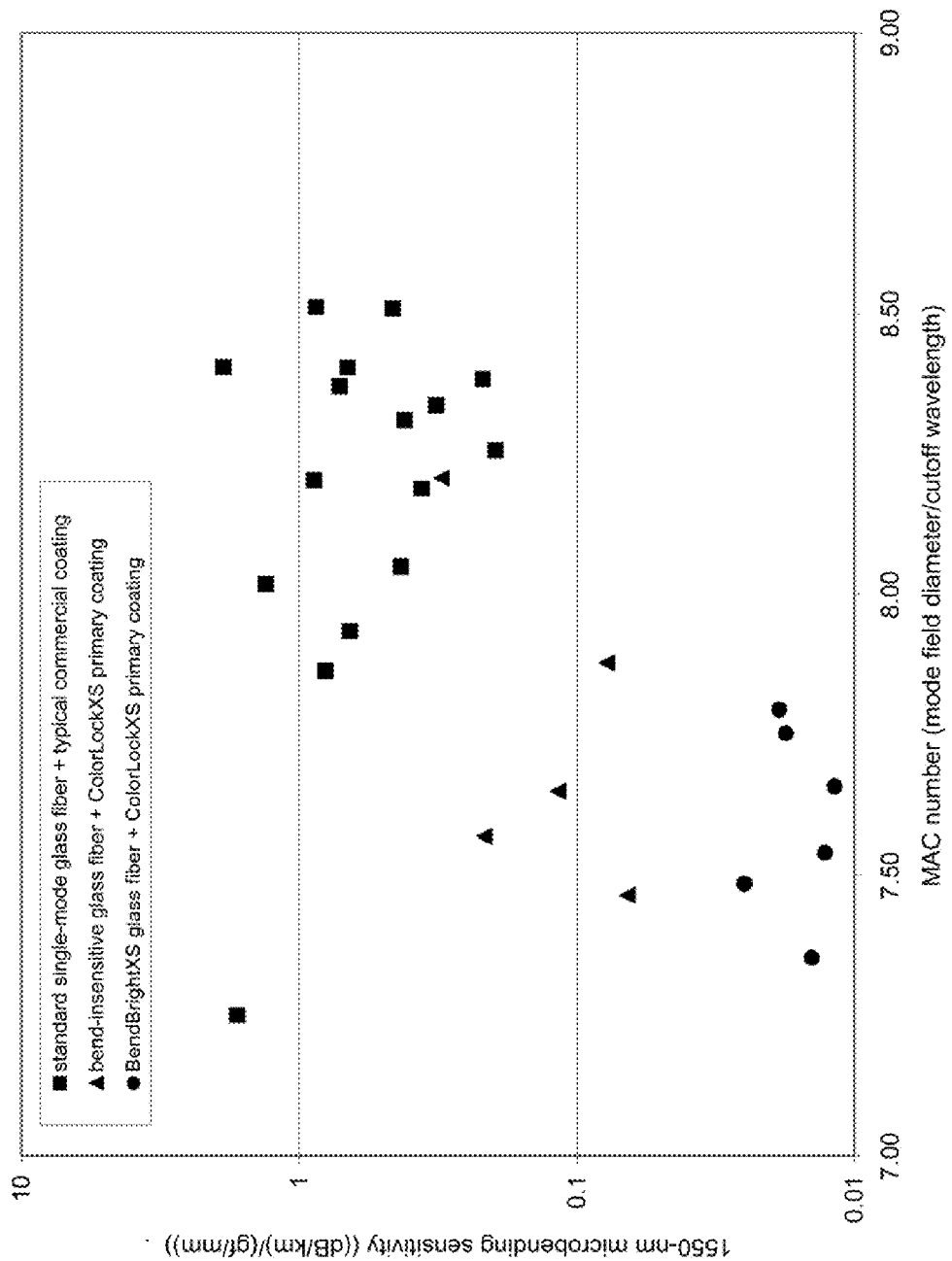
FIG. 12 depicts, on a logarithmic scale, microbend sensitivity as a function of MAC number (i.e., mode field diameter divided by cutoff wavelength) for various exemplary optical fibers.

In addition, FIGS. 11 and 12 depict attenuation and microbend sensitivity, respectively, at a wavelength of 1550 nanometers as a function of MAC number (i.e., mode field diameter divided by cutoff wavelength) for various exemplary optical fibers in accordance with the standard IEC fixed-diameter sandpaper drum test (i.e., IEC TR62221, Method B). The respective attenuation data depicted in FIG. 11 (added loss) and FIG. 12 (microbend sensitivity) were obtained at 23° C. under the test conditions previously described with respect to FIG. 1 (i.e., 400-meter fiber samples were wound at about 2,940 mN (i.e., a tension of 300 gf) on a 300-mm diameter fiber spool wrapped with adhesive-backed, 40-micron grade sandpaper).

FIG. 11 shows that Draka Comteq's bend-resistant, single-mode glass fiber available under the trade name BendBright$^{XS}$® in combination with Draka Comteq's ColorLock$^{XS}$ brand coating system provides outstanding performance with respect to added loss.

FIG. 12 shows that Draka Comteq's bend-resistant, single-mode glass fiber available under the trade name BendBright$^{XS}$® in combination with Draka Comteq's ColorLock$^{XS}$ brand coating system provides superior microbend sensitivity (i.e., microbend sensitivity of 0.01 to 0.03 (dB/km)/(gf/mm)).

The optical fibers according to the present invention typically further include a tough secondary coating to protect the primary coating and glass fiber from damage during handling and installation. For example, the secondary coating might have a modulus of between about 800 MPa and 1,000 MPa (e.g., about 900 MPa) as measured on a standard 75-micron film. As disclosed herein, this secondary coating may be inked as a color code or, preferably, may be color-inclusive to provide identification without the need for a separate inking process.

In one embodiment according to the present invention, the secondary coating, which surrounds the primary coating to thereby protect the fiber structure, features an inclusive coloring system (i.e., not requiring an extra layer of ink to be added for color coding). The colors, which conform to Munsell standards for optical fiber color-coding, are enhanced for brightness and visibility under dim lighting (e.g., in deep shade or in confined spaces, such as manholes) and are easily distinguished against both light and dark backgrounds.

Furthermore, the secondary coating features a surface that provides an excellent interface with ribbon matrix material so that the matrix separates easily from the colored fiber in a way that does not sacrifice robustness. The mechanical properties of the colored secondary coating are balanced with those of the primary coating so that, in heat stripping, the coating/matrix composite separates cleanly from the glass fibers.

Employing Draka Comteq's bend-resistant, single-mode glass fiber available under the trade name BendBright$^{XS}$® (or the trade name BendBright-Elite™) with the present dual-coating system, which includes a low-modulus primary coating, has been found to reduce microbending sensitivity by between about one to two orders of magnitude relative to standard single-mode fiber (SSMF) at the key transmission frequencies of 1550 nanometers and 1625 nanometers. As noted, such optical fiber not only provides outstanding resistance to microbending and macrobending, but also complies with the ITU-T G.657.A/B and ITU-T G.652.D requirements.

In particular, Draka Comteq's bend-resistant, single-mode glass fiber available under the trade name BendBright$^{XS}$® (e.g., enhanced with Draka Comteq's ColorLock$^{XS}$ brand coating system) provides resistance to macrobending required for sustained bends having a radius as low as five (5)

millimeters with an estimated failure probability of less than two (2) breaks per million full-circle bends (i.e., 360°) over 30 years in a properly protected environment. These bend-resistant optical fibers facilitate the rapid deployment of small, flexible cables for the delivery of fiber to the premises/business/home (i.e., FTTx) by virtue of the optical fiber's ability to sustain a loss-free transmission through small-radius bends. Cables employing such bend-resistant optical fibers may be routed around sharp bends, stapled to building frame, coiled, and otherwise employed in demanding environments while retaining clear and strong signal transmission.

In another aspect, the bend-insensitive optical fibers according to the present invention facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to the optical fiber according to the present invention, the component glass fiber typically has an outer diameter of about 125 microns. With respect to the optical fiber's surrounding coating layers, the primary coating typically has an outer diameter of between about 175 microns and about 195 microns (i.e., a primary coating thickness of between about 25 microns and 35 microns) and the secondary coating typically has an outer diameter of between about 235 microns and about 265 microns (i.e., a secondary coating thickness of between about 20 microns and 45 microns). Optionally, the optical fiber according to the present invention may include an outermost ink layer, which is typically between two and ten microns in thickness.

In one alternative embodiment, an optical fiber according to the present invention may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. (Those having ordinary skill in the art will appreciate that, unless otherwise specified, diameter measurements refer to outer diameters.)

In such exemplary embodiments, the primary coating layer may have an outer diameter of between about 135 microns and about 175 microns (e.g., about 160 microns), typically less than 165 microns (e.g., between about 135 microns and 150 microns), and usually more than 140 microns (e.g., between about 145 microns and 155 microns, such as about 150 microns). Moreover, in such exemplary embodiments, the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns).

One exemplary optical-fiber embodiment employs a secondary coating of about 197 microns at a tolerance of +/−5 microns (i.e., a secondary-coating outer diameter of between 192 microns to 202 microns). Typically, the secondary coating will retain a thickness of at least about 10 microns (e.g., an optical fiber having a reduced-thickness secondary coating of between 15 microns and 25 microns).

In accordance with the foregoing, a particular reduced-diameter, optical-fiber embodiment having exceptionally low losses employs Draka Comteq's 125-micron single-mode glass fiber available under the trade name BendBright$^{XS}$® with a 155-micron-diameter, low-modulus primary coating layer (e.g., Draka Comteq's ColorLock$^{XS}$ brand coating system) and a secondary coating (e.g., a nominal 200-micron-diameter secondary coating). As noted, BendBright$^{XS}$® bend-insensitive optical fiber complies with the ITU-T G.657.A/B and ITU-T G.652.D requirements. In this optical-fiber embodiment, the maximum tolerance with respect to the primary-coating thickness is +/−5 microns (i.e., a primary-coating outer diameter of between 150 microns and 160 microns), more typically about +/−2.5 microns (i.e., a primary-coating outer diameter of between about 152.5 microns and 157.5 microns).

Another particular reduced-diameter, optical-fiber embodiment having exceptionally low losses employs Draka Comteq's 125-micron single-mode glass fiber available under the trade name BendBright-Elite™ with a 155-micron-diameter, low-modulus primary coating layer (e.g., Draka Comteq's ColorLock$^{XS}$ brand coating system) and a secondary coating (e.g., a nominal 200-micron-diameter secondary coating). Like BendBright$^{XS}$® bend-insensitive optical fiber, BendBright-Elite™ bend-insensitive optical fiber complies with the ITU-T G.657.A/B and ITU-T G.652.D requirements. In this optical-fiber embodiment, the maximum tolerance with respect to the primary-coating thickness is +/−5 microns (i.e., a primary-coating outer diameter of between 150 microns and 160 microns), more typically about +/−2.5 microns (i.e., a primary-coating outer diameter of between about 152.5 microns and 157.5 microns).

The synergistic combination of (i) Draka Comteq's BendBright$^{XS}$® bend-insensitive single-mode glass fiber (or Draka Comteq's BendBright-Elite™ bend-insensitive glass fiber) and (ii) Draka Comteq's ColorLock$^{XS}$ brand coating system promotes significant reductions in optical-fiber diameter.

By way of example, Draka Comteq's 125-micron BendBright$^{XS}$® bend-insensitive single-mode glass fiber in combination with a 155-micron-diameter, low-modulus primary coating layer (e.g., Draka Comteq's ColorLock$^{XS}$ brand coating system) and a 200-micron-diameter secondary coating layer provides (i) comparable microbending performance to that of a 125-micron, standard single-mode glass fiber coated with a 185-micron-diameter, low-modulus primary coating layer (e.g., Draka Comteq's ColorLock$^{XS}$ brand coating system) and a 242-micron-diameter secondary coating layer and (ii) significantly better microbending performance than that of a standard single-mode optical fiber (SSMF) that employs conventional primary and secondary coatings (i.e., at an outer diameter of about 235-265 microns).

As noted previously, one suitable composition for the primary coating is a UV-curable urethane acrylate product provided by DSM Desotech (Elgin, Ill.) under the trade name DeSolite® DP 1011. It is believed that this UV-curable urethane acrylate product includes about 1.0 percent of adhesion promoter. Other suitable compositions for the primary coating include alternative UV-curable urethane acrylate products provided by DSM Desotech under various trade names, including DeSolite® DP 1014, DeSolite® DP 1014XS, and DeSolite® DP 1016. It is believed that these alternative compositions possess essentially the same low-modulus and glass-transition properties as those possessed by the aforementioned DeSolite® DP 1011 UV-curable urethane acrylate product, albeit with some compositional variation (e.g., adhesion promoter concentration increased to 1.25 percent). As will be appreciated by those having ordinary skill in the art, compositional variations may provide particular primary-coating properties that are desirable for particular applications. It appears that the DeSolite® DP 1014XS UV-curable urethane acrylate product, for instance, exhibits favorable processing characteristics and provides improved delamination resistance.

Those having ordinary skill in the art will appreciate that each of these exemplary UV-curable urethane acrylate products (i.e., DeSolite® DP 1011, DeSolite® DP 1014, DeSolite® DP 1014XS, and DeSolite® DP 1016) provides better microbending performance than do conventional primary coatings, such as other UV-curable urethane acrylate products provided by DSM Desotech under the respective trade names DeSolite® DP 1004 and DeSolite® DP 1007.

EXAMPLE 7

Comparison of Microbending Sensitivity

The respective microbend sensitivities were further measured for exemplary optical fibers, including (i) an enhanced single-mode glass fiber (ESMF) with a low-modulus coating, (ii) various bend-insensitive glass fibers (e.g., Draka Comteq's single-mode glass fibers available under the trade names BendBright$^{XS}$®) with conventional primary coatings, and (iii) various bend-insensitive glass fibers and macrobend-resistant glass fibers (e.g., Draka Comteq's single-mode glass fibers available under the trade names BendBright$^{XS}$® and BendBright®) with low-modulus primary coatings.

The testing procedure for Example 7 was an adaptation of IEC TR62221, Method B, which, as noted, is incorporated by reference in its entirety. For this modified IEC fixed-diameter sandpaper drum test, a 300-millimeter diameter quartz cylinder was wrapped with adhesive-backed, 320-grit sandpaper (i.e., approximately equivalent to 36-micron-grade sandpaper) to create a rough surface—albeit a finer surface than the surfaces employed in Examples 3-6. Then, each 440-meter fiber sample was wound in a single layer at about 1,470 mN (i.e., a controlled tension of 150 gf on the 300-millimeter diameter quartz drum using a Delachaux optical fiber winding apparatus). For the sake of convenience, this particular modification of the IEC TR62221, Method B, is herein referred to as the "Reduced-Diameter Optical-Fiber Microbend Sensitivity Test."

Two hours after winding, fiber attenuation was measured at room temperature (i.e., 23° C.) using an optical time domain reflectometer (OTDR). Then, the drum (with 440 meters of wound fiber) was temperature cycled in a temperature-controlled chamber from about room temperature through (i) −40° C. and (ii) −60° C. Fiber attenuation was measured by an optical time domain reflectometer (OTDR) after two hours of equilibration at both −40° C. and −60° C.

Absolute fiber attenuation measured at a wavelength of 1550 nanometers is provided (below) in Table 2.

TABLE 2

(Microbend Sensitivity - 1550 nm)

| Ex. | Optical Fiber glass fiber w/primary coating (glass fiber and coating diameters) | 23° C. (dB/km) | −40° C. (dB/km) | −60° C. (dB/km) |
|---|---|---|---|---|
| 200-micron bend-insensitive SMFs with low-modulus primary coatings ||||
| A | BendBright$^{XS}$ ® w/DP1014XS (125μ/155μ/199μ) | 1.114 | 1.019 | 1.002 |
| B | BendBright$^{XS}$ ® w/DP1014XS (125μ/150μ/199μ) | 1.786 | 1.612 | 1.542 |
| C | BendBright$^{XS}$ ® w/DP1016 (125μ/150μ/199μ) | 1.488 | 1.367 | 1.536 |
| 200-micron bend-insensitive SMFs with conventional primary coatings ||||
| D | BendBright$^{XS}$ ® w/DSM 950-076 (125μ/160μ/199μ) | 2.726 | 3.215 | 3.595 |
| E | BendBright$^{XS}$ ® w/DSM 950-076 (125μ/150μ/199μ) | 4.288 | 4.766 | 5.150 |
| 200-micron macrobend-resistant SMFs with low-modulus primary coatings ||||
| F | BendBright ® w/DP1014XS (125μ/150μ/199μ) | 4.683 | 4.348 | 4.878 |
| G | BendBright ® w/DP1016 (125μ/150μ/199μ) | 5.985 | 5.800 | 6.399 |
| 242-micron enhanced SMF with low-modulus primary coatings ||||
| H | ESMF w/DP1014 (125μ/190μ/242μ) | 0.705 | 0.663 | 0.648 |

Table 2 (above) shows that Draka Comteq's 125-micron BendBright$^{XS}$® bend-insensitive single-mode glass fiber facilitates a reduction in total optical-fiber diameter by permitting use of thinner primary and/or secondary coatings. In this regard, a 200-micron optical fiber using Draka Comteq's BendBright$^{XS}$® bend-insensitive single-mode glass fiber and relatively thin primary and secondary coatings provides microbending performance that approaches that of a 242-micron optical fiber having an enhanced standard single-mode fiber (ESMF) and thicker layers of comparable low-modulus primary and secondary coatings.

Absolute fiber attenuation measured at a wavelength of 1310 nanometers is provided (below) in Table 3:

TABLE 3

(Microbend Sensitivity - 1310 nm)

| Ex. | Optical Fiber glass fiber w/primary coating (glass fiber and coating diameters) | 23° C. (dB/km) | −40° C. (dB/km) | −60° C. (dB/km) |
|---|---|---|---|---|
| 200-micron bend-insensitive SMFs with low-modulus primary coatings ||||
| A | BendBright$^{XS}$ ® w/DP1014XS (125μ/155μ/199μ) | 0.954 | 0.869 | 0.758 |
| B | BendBright$^{XS}$ ® w/DP1014XS (125μ/150μ/199μ) | 1.574 | 1.426 | 1.478 |
| C | BendBright$^{XS}$ ® w/DP1016 (125μ/150μ/199μ) | 1.496 | 1.381 | 1.509 |
| 200-micron bend-insensitive SMFs with conventional primary coatings ||||
| D | BendBright$^{XS}$ ® w/DSM 950-076 (125μ/160μ/199μ) | 2.238 | 2.683 | 3.015 |
| E | BendBright$^{XS}$ ® w/DSM 950-076 (125μ/150μ/199μ) | 4.020 | 4.363 | 4.671 |
| 200-micron macrobend-resistant SMFs with low-modulus primary coatings ||||
| F | BendBright ® w/DP1014XS (125μ/150μ/199μ) | 2.670 | 2.447 | 2.761 |
| G | BendBright ® w/DP1016 (125μ/150μ/199μ) | 3.725 | 3.550 | 3.927 |

The comparative 200-micron optical fiber designated Example D in Tables 2 and 3 (above) employed the secondary coating used in Draka Comteq's ColorLock$^{XS}$ brand coating system, albeit with a conventional primary coating. The comparative 200-micron optical fiber designated Example E in Tables 2 and 3 (above) employed both a conventional primary coating (i.e., DSM 950-076) and a conventional secondary coating (i.e., DSM 950-044).

Tables 2 and 3 (above) indicate that, all things being equal, the low-modulus primary coatings according to the present invention (e.g., Draka Comteq's ColorLock$^{XS}$ brand coating system) provide better microbending performance than do conventional coating systems. This superior microbending performance is especially important when employing a primary-coating layer at a significantly reduced thickness on a 125-micron glass fiber in order to achieve a nominal 200-micron optical fiber.

Moreover, Tables 2 and 3 (above) indicate that, all things being equal, Draka Comteq's single-mode glass fibers available under the trade name BendBright$^{XS}$®, which employ a trench-assisted design, provide better microbending performance than do single-mode fibers that do not employ trench-assisted and/or void-assisted design (e.g., Draka Comteq's single-mode glass fibers available under the trade name BendBright®). This is somewhat unexpected—trench-assisted and other bend-insensitive glass designs are generally understood to have more pronounced effects upon macrobending rather than microbending.

EXAMPLE 8

Comparison of Microbend Sensitivity

The respective microbend sensitivities were further measured in accordance with the IEC fixed-diameter sandpaper drum test (i.e., IEC TR62221, Method B) for exemplary optical fibers, including (i) enhanced single-mode glass fibers (ESMF) with Draka Comteq's ColorLock brand coating system and (ii) Draka Comteq's single-mode glass fibers available under the trade name BendBright$^{XS}$® with Draka Comteq's improved ColorLock$^{XS}$ brand coating system.

As with Example 7 (above), the testing procedure for Example 8 was likewise an adaptation of IEC TR62221, Method B (i.e., the "Reduced-Diameter Optical-Fiber Microbend Sensitivity Test"). For this modified IEC fixed-diameter sandpaper drum test, a 300-millimeter diameter quartz cylinder was wrapped with adhesive-backed, 320-grit sandpaper (i.e., approximately equivalent to 36-micron-grade sandpaper) to create a rough surface. Then, each 440-meter fiber sample was wound in a single layer at about 1,470 mN (i.e., a controlled tension of 150 gf on the 300-millimeter diameter quartz drum using a Delachaux optical fiber winding apparatus). Two hours after winding, fiber attenuation was measured at room temperature (i.e., 23° C.) using an optical time domain reflectometer (OTDR).

Absolute fiber attenuation measured at a wavelength of 1550 nanometers is provided (below) in Table 4.

TABLE 4

| | (Microbend Sensitivity - 1550 nm) | |
|---|---|---|
| Ex. | Optical Fiber glass fiber w/primary coating (glass fiber and coating diameters) | 23° C. (dB/km) |
| | nominal 200-micron bend-insensitive SMFs with low-modulus primary coatings | |
| A | BendBright$^{XS}$ ® w/DP1014XS (125μ/153μ/194μ) | 0.97 |
| B | BendBright$^{XS}$ ® w/DP1014XS (125μ/154μ/197μ) | 0.98 |
| C | BendBright$^{XS}$ ® w/DP1014XS (125μ/154μ/198μ) | 1.05 |
| D | BendBright$^{XS}$ ® w/DP1014XS (125μ/158μ/200μ) | 0.74 |
| E | BendBright$^{XS}$ ® w/DP1014XS (125μ/160μ/201μ) | 0.70 |
| | 242-micron enhanced SMFs with conventional primary coatings | |
| F | ESMF w/DP1007 (125μ/190μ/242μ) | 2.004 |
| G | ESMF w/DP1007 (125μ/190μ/242μ) | 1.661 |
| H | ESMF w/DP1007 (125μ/190μ/242μ) | 1.542 |
| I | ESMF w/DP1007 (125μ/190μ/242μ) | 1.568 |
| J | ESMF w/DP1007 (125μ/190μ/242μ) | 1.973 |

Table 4 (above) shows that, Draka Comteq's 125-micron BendBright$^{XS}$® bend-insensitive single-mode glass fiber in combination with (i) a low-modulus primary coating having an outer diameter of between about 150 microns and 160 microns and (ii) a secondary coating having an outer diameter of between about 195 microns and 200 microns provides significantly better microbending performance compared with that of conventional 125-micron enhanced single-mode glass fiber (ESMF) in combination with a 190-micron-diameter, conventional primary coating and a 242-micron-diameter, conventional secondary coating.

Stated otherwise, a nominal 200-micron optical fiber formed from Draka Comteq's 125-micron BendBright$^{XS}$® bend-insensitive single-mode glass fiber and Draka Comteq's ColorLock$^{XS}$ brand coating system provides superior microbending performance to that of a 242-micron, enhanced single-mode optical fiber (ESMF) that employs conventional primary and secondary coatings.

Moreover, a nominal 200-micron optical fiber formed from Draka Comteq's 125-micron BendBright$^{XS}$® bend-insensitive single-mode glass fiber and Draka Comteq's ColorLock$^{XS}$ brand coating system provides similar microbending performance to that of a 242-micron, enhanced single-mode optical fiber (ESMF) that employs a comparable low-modulus primary coating and a comparable secondary coating. By way of example, the 200-micron optical fibers designated Examples A-E in Table 4 (above) provide comparable microbending performance to that of the 242-micron optical fiber designated Example H in Table 2 (above), which, as noted, is a 242-micron optical fiber having an enhanced standard single-mode fiber (ESMF) and thicker layers of comparable low-modulus primary and secondary coatings.

As noted, whereas single-mode glass fibers that are commercially available from Draka Comteq under the trade name BendBright® are compliant with the ITU-T G.652.D requirements, single-mode glass fibers that are commercially available from Draka Comteq under the trade names BendBright$^{XS}$® and BendBright-Elite™ are compliant with the ITU-T G.652.D requirements and the ITU-T G.657.A/B requirements. The respective ITU-T G.652 recommendations and the respective ITU-T G.657 recommendations are hereby incorporated by reference in their entirety.

In this regard, this application incorporates by reference product specifications for the following Draka Comteq single-mode optical fibers: (i) Enhanced Single Mode Fiber (ESMF); (ii) BendBright® single-mode optical fiber; (iii) BendBright$^{XS}$® single-mode optical fiber; and (iv) BendBright-Elite™ single-mode optical fiber. This technical information is provided as Appendices 1-4, respectively, in priority U.S. Provisional Application No. 61/248,319 for a Reduced-Diameter Optical Fiber (filed Oct. 2, 2009), which, as noted, is incorporated by reference in its entirety.

It is within the scope of the present invention to achieve reduced-diameter optical fibers by employing other kinds of trench-assisted, bend-insensitive glass fibers. In this regard, U.S. Patent Application Publication No. US 2008/0056654 A1 for a for a Low Bend Loss Single-Mode Optical Fiber (Bickham et al.), which is hereby incorporated by reference in its entirety, discloses a glass fiber that includes a cladding region with a depressed refractive index.

Furthermore, it is within the scope of the present invention to achieve reduced-diameter optical fibers by employing bend-insensitive glass fibers that include regular or random holes, whether continuous or discrete, in an annular region (e.g., an inner cladding). In this regard, U.S. Pat. No. 7,444,838 for a Holey Optical Fiber with Random Pattern of Holes and Method for Making the Same (Pickrell et al.) and U.S. Pat. No. 7,567,742 for a Holey Optical Fiber with Random Pattern of Holes and Method for Making Same (Pickrell et al.), each of which is hereby incorporated by reference in its entirety, disclose a glass fiber that includes a holey region (e.g., a cladding) with a random array of holes. Similarly, U.S. Pat. No. 7,450,806 for Microstructured Optical Fibers and Methods (Bookbinder et al.), which is hereby incorporated by reference in its entirety, discloses a microstructured glass fiber that includes voids within the cladding region.

Other trench-assisted and/or void-assisted optical fibers are disclosed in the following patents and patent application publications, each of which is hereby incorporated by reference in its entirety: U.S. Pat. No. 4,852,968 for an Optical Fiber Comprising a Refractive Index Trench (Reed); U.S. Pat. No. 5,044,724 for a Method of Producing Optical Fiber, and Fiber Produced by the Method (Glodis et al.); U.S. Pat. No. 6,901,197 for a Microstructured Optical Fiber (Hasegawa et al.); U.S. Pat. No. 7,095,940 for an Optical Fiber, Method for Manufacturing Same and Optical Transmission Channel (Hayami et al.); U.S. Pat. No. 7,228,040 for a Hole-Assisted Single Mode Optical Fiber (Nakajima et al.); U.S. Pat. No. 7,239,784 for an Optical Fiber, Method for Manufacturing Same and Optical Transmission Channel (Hayami et al.); U.S. Pat. No. 7,292,762 for a Hole-Assisted Holey Fiber and Low Bending Loss Multimode Holey Fiber (Guan et al.); U.S. Pat. No. 7,433,566 for a Low Bend Loss Optical Fiber with High Modulus Coating (Bookbinder et al.); U.S. Pat. No. 7,526,166 for a High Numerical Aperture Fiber (Bookbinder et al.); U.S. Pat. No. 7,526,169 for a Low Bend Loss Quasi-Single-Mode Optical Fiber and Optical Fiber Line (Bickham et al.); U.S. Pat. No. 7,555,187 for a Large Effective Area Fiber (Bickham et al.); U.S. Pat. No. 7,450,807 for a Low Bend Loss Optical Fiber with Deep Depressed Ring (Bickham et al.); U.S. Pat. No. 7,574,088 for an Optical Fiber and Optical Fiber Ribbon, and Optical Interconnection System (Sugizaki et al.); U.S. Patent Application Publication No. US 2008/0166094 A1 for a Bend Resistant Multimode Optical Fiber (Bickham et al.); U.S. Patent Application Publication No. US 2008/0304800 A1 for an Optical Fiber with Large Effective Area (Bickham et al.); U.S. Patent Application Publication No. US 2009/0060437 A1 for Bend Insensitivity in Single Mode Optical Fibers (Fini et al.); U.S. Patent Application Publication No. US 2009/0126407 A1 for Methods for Making Optical Fiber Preforms and Microstructured Optical Fibers (Bookbinder et al.); U.S. Patent Application Publication No. US 2009/0154888 A1 for a Bend Resistant Multimode Optical Fiber (Steele et al.); U.S. Patent Application Publication No. US 2009/0169163 A1 for a Bend Resistant Multimode Optical Fiber (Steele et al.); and International Patent Application Publication No. WO 2009/064381 A1 for Methods for Making Optical Fiber Preforms and Microstructured Optical Fibers (Bookbinder et al.).

It is believed that the foregoing glass fibers, as well as other glass fibers disclosed in previously incorporated-by-reference patent documents, might be combined with the low-modulus primary coatings as herein disclosed to achieve satisfactory, reduced-diameter optical fibers. As such, the resulting reduced-diameter optical fibers (e.g., holey fibers with low-modulus primary coatings) are within the scope of the present invention.

That said, it has been preliminarily observed that, with respect to reduced-diameter optical fibers having low-modulus primary coatings, bend-insensitive glass fibers having full-solid designs (e.g., 125-micron BendBright$^{XS}$® bend-insensitive single-mode glass fiber) seem to provide better microbending performance than do bend-insensitive glass fibers having hole-assisted designs.

Furthermore, it has been preliminarily observed that, with respect to reduced-diameter optical fibers, bend-insensitive glass fibers having full-solid designs (e.g., 125-micron BendBright$^{XS}$® bend-insensitive single-mode glass fiber) also seem to provide better mechanical performance than do bend-insensitive glass fibers having void-assisted designs (e.g., holey fibers). Those having ordinary skill in the art will appreciate that mechanical robustness is an important consideration when employing a bend-insensitive glass fiber within a nominal 200-micron optical fiber.

In this regard, 200-micron optical fibers that are formed from (i) Draka Comteq's 125-micron BendBright$^{XS}$® bend-insensitive single-mode glass fiber, which has a full-solid glass design, and (ii) Draka Comteq's ColorLock$^{XS}$ brand coating system demonstrate comparable mechanical reliability to that of a standard 242-micron optical fiber (e.g., a SSMF).

The 200-micron optical fibers that are formed from Draka Comteq's 125-micron BendBright$^{XS}$® bend-insensitive single-mode glass fiber and Draka Comteq's ColorLock$^{XS}$ brand coating system were tested for tensile strength and dynamic fatigue in accordance with the FOTP-28 standard, which is hereby incorporated by reference in its entirety. Representative mechanical reliability for these 200-micron optical fibers, which possessed differently colored secondary coatings, is provided (below) in Table 5.

TABLE 5

(Mechanical Reliability)

| ColorLock$^{XS}$ color | Tensile Strength 50% failure (kpsi) | Tensile Strength 15% failure (kpsi) | Dynamic Fatigue (n-value) |
|---|---|---|---|
| Blue | 711 | 539 | 22.5 |
| Orange | 712 | 626 | 22.0 |
| Green | 705 | 600 | 20.4 |
| Brown | 675 | 557 | 20.8 |
| Slate | 721 | 623 | 22.8 |
| White | 729 | 577 | 21.8 |
| Red | 708 | 577 | 20.9 |
| Black | 709 | 627 | 22.8 |
| Yellow | 715 | 540 | 21.4 |

TABLE 5-continued (Mechanical Reliability)

| ColorLock$^{XS}$ color | Tensile Strength 50% failure (kpsi) | Tensile Strength 15% failure (kpsi) | Dynamic Fatigue (n-value) |
|---|---|---|---|
| Violet | 713 | 580 | 21.6 |
| Rose | 723 | 557 | 21.9 |
| Aqua | 730 | 580 | 23.0 |

As will be understood by those having ordinary skill in the art, industry minimum requirements for tensile strength at fiber failure are 550 kpsi at the $50^{th}$ percentile of the optical-fiber tensile-strength distribution (i.e., the median tensile strength) and 455 kpsi at the $15^{th}$ percentile of the optical-fiber tensile-strength distribution.

The industry minimum requirement for the dynamic fatigue stress corrosion factor (n-value) is 18. In this regard, dynamic fatigue stress corrosion factor provides an indication of how fast a flaw in the glass fiber's silica structure propagates under strain.

As will be further understood by those having ordinary skill in the art, for both tensile strength and dynamic fatigue stress corrosion factor, an adequate sampling of optical fibers (e.g., n=30) provides a statistical estimate that facilitates characterization the optical-fiber population.

In another alternative embodiment, the outer diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers.

As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

It seems that reducing the diameter of the component glass fiber might make the resulting optical fiber more susceptible to microbending attenuation. For example, as compared with a component glass fiber having a standard diameter of 125 microns, a component glass fiber having a diameter of 110 microns might be twice as susceptible to microbending losses. That said, the advantages of further reducing optical-fiber diameter may be worthwhile for some optical-fiber applications.

In view of the foregoing, commonly assigned U.S. Patent Application No. 61/177,996 for a Reduced-Diameter Optical Fiber, filed May 13, 2009, (Overton) and U.S. Patent Application No. 61/248,319 for a Reduced-Diameter Optical Fiber, filed Oct. 2, 2009, (Overton) are hereby incorporated by reference in their entirety.

As noted, the optical fiber according to the present invention may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

As discussed previously, combining (i) a coating system according to the present invention with (ii) a glass fiber having a refractive index profile that itself provides bend resistance (e.g., low macrobending sensitivity) has been found to provide unexpectedly superior reductions in microbend sensitivity. Indeed, bend-insensitive glass fibers are especially suitable for use with the coating system of the present invention (e.g., Draka Comteq's ColorLock$^{XS}$ brand coating system).

Accordingly, the optical fiber (e.g., bend-insensitive optical fiber) as herein disclosed may be included in a reduced-diameter, easy-access loose-tube cable.

In contrast to conventional loose-tube cable designs, this loose-tube cable employs relatively thin-walled, low-modulus buffer tubes (i.e., low-modulus micromodules, microsheaths or "flextubes") that can be readily accessed without special tools. In one embodiment, five or more flextube units (i.e., a flextube enclosing one or more optical fibers) may be stranded around a central strength member and surrounded by a cable jacket. That said, cable designs employing fewer than five flextube units (i.e., micromodule units), such as one or more flextube units, are within the scope of the present invention.

The central strength member typically has an outer diameter of between about 1.0 millimeter and 5.0 millimeters. The central strength member may be formed from various materials, such as fiber-reinforced plastic (FRP) or glass-reinforced plastic (GRP). The stranding of flextube units around the central strength member can be accomplished in one direction (e.g., "S" helical stranding or "Z" helical stranding). In this regard, it has been observed that helical stranding helps to equalize the response of each flextube when the cable is subjected to bending. Alternatively, Reverse Oscillated Lay stranding, known as "S-Z" stranding, may be employed. The present cable my include one or more binder threads, which may help to hold the flextube units in place. Strength elements (e.g., aramid yarns) may also help in holding the flextube units in place.

Typically, the flextubes are formed from a polymeric material having a Young's modulus (e.g., at 25° C.) of less than about 300 megapascals (MPa), typically less than about 200 MPa (e.g., 50 MPa to 150 MPa), and more typically less than about 100 MPa. To achieve a Young's modulus less than about 100 MPa, exemplary flextubes may be formed from a thermoplastic copolyester elastomer, such as Hytrel® HTR8351, which is commercially available from DuPont. That said, other materials having a suitable Young's modulus may be employed.

By way of example, the flextubes may be formed from a material having a Young's modulus of between about 10 MPa and 90 MPa (e.g., 25 MPa to 75 MPa). In some embodiments, the flextubes may be formed from a material having a Young's modulus greater than about 50 MPa. In other embodiments, the flextubes may be formed from a material having a Young's modulus less than 50 MPa (e.g., about 17 MPa), such as between about 20 MPa and 40 MPa (e.g., between about 25 MPa and 30 MPa).

Table 6 (below) depicts various characteristics (in addition to Young's modulus) of typical flextubes in accordance with the present invention.

TABLE 6

(Flextube Characteristics)

| Characteristic | Typical Value |
| --- | --- |
| Tensile Strength (Mpa) | 5-18 |
| Elongation at Break (%) | <350 |
| Young's Modulus (Mpa) (25° C.) | <300 |
| Young's Modulus (Mpa) (−45° C.) | <1200 |
| Hardness Shore D (15 s) | <45 |
| Hardness Shore A (15 s) | >85 |
| Melting Temperature (° C.) | >130 |
| Melt Mass Flow Rate (g/10 min) (190° C., 2.16 kg) | >3 |
| Shrinkage (%) (85° C.) | <1.0 |
| Oxidative Induction Time (min) | >35 |
| Coefficient of Thermal Expansion (μm/m) (85° C.) | <200 |
| Coefficient of Thermal Expansion (μm/m) (−40° C.) | <50 |

The present flextubes typically have a wall thickness of between about 0.1 millimeter and 0.5 millimeter, more typically between about 0.1 millimeter and 0.3 millimeter (e.g., about 0.2 millimeter). Moreover, an exemplary flextube suitable for enclosing 12 bend-insensitive fibers according to the present invention typically has a diameter of between about 1.0 millimeter and 1.8 millimeters, more typically between about 1.2 and 1.4 millimeters (e.g., about 1.3 millimeters).

By way of comparison, in conventional loose-tube cables, a relatively hard buffer tube formed from polypropylene or polybutylene terephthalate might be used. To provide sufficient protection for 12 standard single-mode fibers (SSMF) such a high-modulus buffer tube might require a diameter of between about 1.5 millimeters and 3.5 millimeters and a wall thickness of between about 0.2 millimeter and 0.5 millimeter.

The present flextubes have a relatively high micromodule filling coefficient. As used herein, the term "micromodule filling coefficient" refers to the ratio of the total cross-sectional area of the fibers within a micromodule versus the inner cross-sectional area of that micromodule (i.e., defined by the inner boundary of the micromodule).

Optical-fiber cables of the present invention include flextubes typically having a micromodule filling coefficient greater than 0.3, more typically greater than about 0.5, such as 0.65 or more (e.g., about 0.7). For example, a flextube (i) having an outer diameter of about 1.3 millimeters and an inner diameter of about 1.0 millimeter and (ii) containing twelve (12) 242-micron optical fibers would have a micromodule filling coefficient of about 0.7.

Additionally, as used herein, the term "cumulative micromodule filling coefficient" refers to the ratio of the total cross-sectional area of the optical fibers enclosed within micromodules versus the sum of the inner cross-sectional areas of the micromodules containing those optical fibers. In this regard, the present optical-fiber cables typically have a cumulative micromodule filling coefficient of about 0.3 or more, such as at least about 0.5 (e.g., about 0.6 or higher).

With respect to the present loose-tube cable, yarns, nonwovens, fabrics (e.g., tapes), foams, or other materials containing water-swellable material and/or coated with water-swellable material (e.g., super absorbent polymers (SAPs), such as SAP powder) may be employed within the cable to provide water blocking. The flextubes themselves may include filling greases or lubricants (e.g., thixotropic filling greases). Alternatively, the present loose-tube cable may employ dry structures (i.e., grease-free flextubes).

The cable jacket may be formed from polymeric materials, such as polyethylene, polypropylene, polyvinyl chloride (PVC), polyamides (e.g., nylon), polyester (e.g., PBT), fluorinated plastics (e.g., perfluoroethylene propylene, polyvinyl fluoride, or polyvinylidene difluoride), and/or ethylene vinyl acetate. The cable jacket and/or the low-modulus flextube may contain additives, such as nucleating agents, flame-retardants, smoke-retardants, antioxidants, UV absorbers, and/or plasticizers.

An exemplary optical-fiber cable according to the present invention having a cable-jacket outer diameter of about 8.5 millimeters may include twelve flextubes, each containing twelve optical fibers. An exemplary optical-fiber cable according to the present invention having a cable jacket outer diameter of about 6.0 millimeters may include six flextubes, each containing twelve optical fibers. Typically, the thickness of the cable jacket is at least about 0.5 millimeter (e.g., about 0.7 millimeter).

Strength yarns (e.g., aramid, fiberglass, or polyester) and/or steel tape may be included within the cable to provide additional mechanical protection (e.g., from rodents). Similarly, metallic or fiberglass reinforcing rods (e.g., glass-reinforced plastic (GRP)) may also be incorporated into the cable jacket, or an additional outer jacket may be employed for more protection. Ripcords may also be positioned, for example, within the cable jacket.

Figure 13:
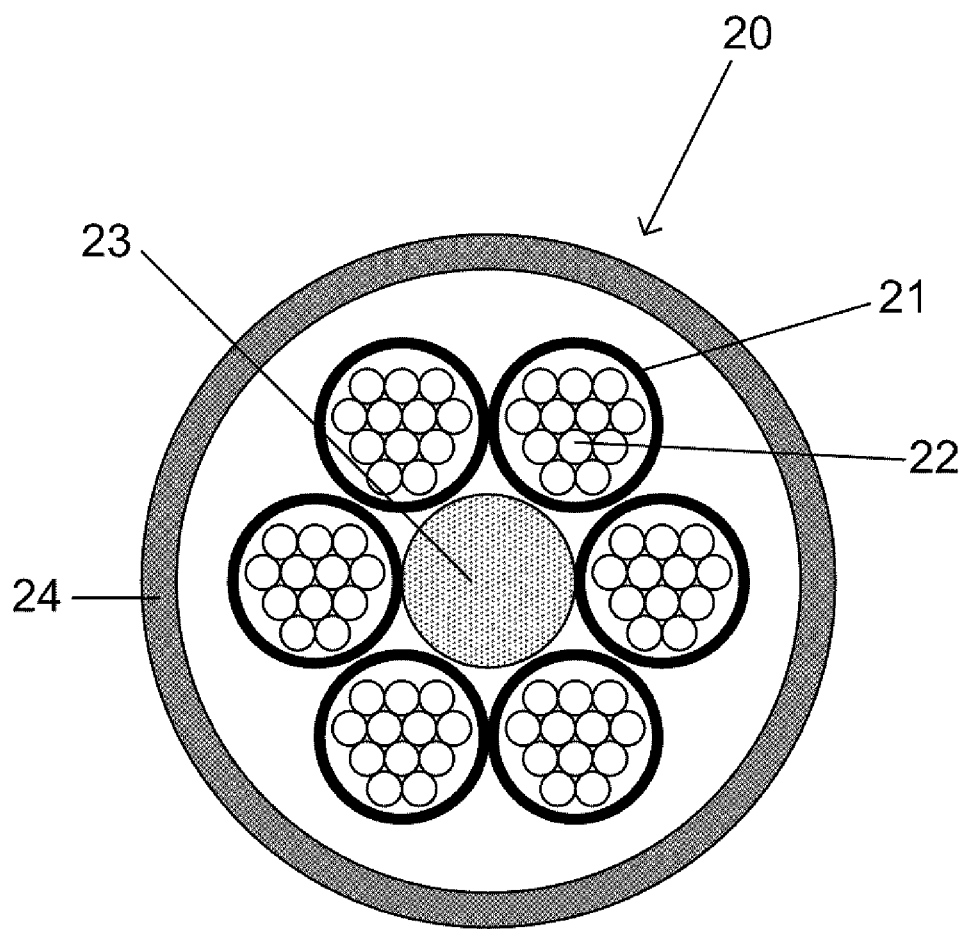
FIG. 13 schematically depicts a cross-sectional view of an exemplary easy-access, loose-tube cable employing bend-insensitive optical fiber according to the present invention.

FIG. 13 depicts an exemplary loose-tube cable 20 in accordance with the present invention. The loose-tube cable 20 includes six flextubes 21, each of which contains twelve optical fibers 22. The flextubes 21 are stranded about a central strength member 23, which is centrally positioned within a cable jacket 24.

The present optical-fiber cables typically comply with various testing standards from the International Electrotechnical Commission (IEC), including the following: maximum working tension (IEC 60794-1-2-E1); crush (IEC 60794-1-2-E3); impact (IEC 60794-1-2-E4); repeated bending (IEC 60794-1-2-E6); torsion (IEC 60794-1-2-E7); cable kink (IEC 60794-1-2-E10); cable bend (IEC 60794-1-2-E11); temperature cycling (IEC 60794-1-2-F1); and water penetration (IEC 60794-1-2-F5). Each of the foregoing IEC standards is hereby incorporated by reference in its entirety.

Moreover, the optical-fiber cables according to the present invention may meet or exceed certain Telcordia Technologies generic requirements for optical-fiber cables as set forth in GR-20-CORE (Issue 2, July 1998; Issue 3, May 2008), such as low-temperature and high-temperature cable bend (6.5.3); impact resistance (6.5.4); compression (6.5.5); tensile strength of cable (6.5.6); cable twist (6.5.7); cable cyclic flexing (6.5.8); mid-span buffer tube performance of stranded cable (6.5.11); temperature cycling (6.6.3); cable aging (6.6.4); cable freezing (6.6.5); and water penetration (6.6.7). These GR-20-CORE generic requirements (i.e., Issue 2, July 1998, and Issue 3, May 2008, respectively) are hereby incorporated by reference in their entirety.

The foregoing flextube cable design and the present bend-insensitive fiber technology provides a small stranded cable that can be readily accessed without tools, yet satisfies industry standards with respect to attenuation during installation and operation.

This application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Patent Application Publication No. US2009/0003781 A1 for an Optical Fiber Cable Having a Deformable Coupling Element (Parris et al.); U.S. Patent Application Publication No. US2009/0003779 A1 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Ser. No. 12/466,965 for an Optical Fiber Telecommunication Cable, filed May 15, 2009, (Tatat); U.S. Patent Application Ser. No. 12/506,533 for a Buffer Tube with Adhesively Coupled Optical Fibers and/or Water-Swellable Element, filed Jul. 21, 2009, (Overton et al.); U.S. Patent Application Ser. No. 12/557,055 for an Optical Fiber Cable Assembly, filed Sep. 10, 2009, (Barker et al.); U.S. Patent Application Ser. No. 12/557,086 for a High-Fiber-Density Optical Fiber Cable, filed Sep. 10, 2009, (Louie et al.); U.S. Patent Application Ser. No. 12/558,390 for a Buffer Tubes for Mid-Span Storage, filed Sep. 11, 2009, (Barker); U.S. Patent Application Ser. No. 12/614,692 for Single-Fiber Drop Cables for MDU Deployments, filed on Nov. 9, 2009, and corresponding U.S. Patent Application Publication No. US2010/0135623 A1, published Jun. 3, 2010, (Overton); U.S. Patent Application Ser. No. 12/614,754 for Optical-Fiber Loose Tube Cables, filed on Nov. 9, 2009, (Overton); U.S. Patent Application Ser. No. 12/615,003 for a Reduced-Size Flat Drop Cable, filed on Nov. 9, 2009, and corresponding U.S. Patent Application Publication No. US2010/0135624 A1, published Jun. 3, 2010, (Overton et al.); U.S. Patent Application Ser. No. 12/615,106 for ADSS Cables with High-Performance Optical Fiber, filed on Nov. 9, 2009, (Overton); U.S. Patent Application No. 12/615,698 for Reduced-Diameter Ribbon Cables with High-Performance Optical Fiber, filed on Nov. 10, 2009, (Overton); U.S. Patent Application No. 61/112,845 for Single-Fiber Drop Cables for MDU Deployments, filed Nov. 10, 2008, (Overton); U.S. Patent Application No. 61/112,863 for Bend-Insensitive-Fiber Loose Tube Cables, filed Nov. 10, 2008, (Overton); U.S. Patent Application No. 61/112,912 for a Reduced-Size Flat Drop Cable with Bend-Insensitive Fiber, filed Nov. 10, 2008, (Overton); U.S. Patent Application No. 61/112,926 for ADSS Cables with Bend-Insensitive Fiber, filed Nov. 10, 2008, (Overton); U.S. Patent Application No. 61/112,965 for Reduced-Diameter Ribbon Cables with High-Performance Optical Fiber, filed Nov. 10, 2008, (Overton); U.S. Patent Application No. 61/113,067 for a Reduced-Diameter, Easy-Access Loose Tube Cable, filed Nov. 10, 2008, (Overton).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:
1. A micromodule unit, comprising:
a micromodule, said micromodule enclosing one or more optical fibers, wherein said micromodule possesses a micromodule filling coefficient of at least about 0.3;
wherein at least one of said optical fibers comprises a glass fiber and a primary coating surrounding said glass fiber, said primary coating possessing (i) an in situ modulus of less than 0.50 MPa and (ii) a glass transition temperature of less than −55° C.

2. A micromodule unit according to claim 1, wherein at least one of said optical fibers is a single-mode optical fiber.

3. A micromodule unit according to claim 1, wherein at least one of said optical fibers meets the ITU-T G.657.A standard and/or the ITU-T G.657.B standard.

4. A micromodule unit according to claim 1, wherein at least one of said optical fibers is a multimode optical fiber.

5. A micromodule unit according to claim 1, wherein said primary coating possesses an in situ modulus of between 0.2 MPa and 0.5 MPa.

6. A micromodule unit according to claim 1, wherein said micromodule possesses a micromodule filling coefficient of at least about 0.5.

7. A micromodule unit according to claim 1, wherein said micromodule possesses a micromodule filling coefficient of at least about 0.65.

8. A micromodule unit according to claim 1, wherein said micromodule comprises polymeric material having a Young's modulus of less than about 100 MPa.

9. A micromodule unit according to claim 1, wherein said micromodule comprises material having a Young's modulus of between about 10 MPa and 40 MPa.

10. An optical-fiber cable, comprising:
a cable jacket; and
a plurality of micromodules positioned within said cable jacket, wherein one or more of said micromodules enclose one or more optical fibers and wherein one or more of said micromodules possess a micromodule filling coefficient of at least about 0.3;
wherein at least one of said optical fibers comprises a glass fiber and a primary coating surrounding said glass fiber, said primary coating possessing (i) an in situ modulus of less than 0.50 MPa and (ii) a glass transition temperature of less than −55° C.

11. An optical-fiber cable according to claim 10, comprising a central strength member centrally positioned within said cable jacket.

12. An optical-fiber cable according to claim 11, wherein said micromodules are stranded around said central strength member.

13. An optical-fiber cable according to claim 10, wherein at least one of said optical fibers meets the ITU-T G.657.A standard and/or the ITU-T G.657.B standard.

14. An optical-fiber cable according to claim 10, wherein said primary coating possesses an in situ modulus of less than about 0.4 MPa.

15. An optical-fiber cable according to claim 10, wherein one or more of said micromodules possess a micromodule filling coefficient of at least about 0.6.

16. An optical-fiber cable according to claim 10, wherein the optical-fiber cable possesses a cumulative micromodule filling coefficient of at least about 0.5.

17. An optical-fiber cable according to claim 10, wherein at least one of said micromodules comprises material having a Young's modulus of less than about 200 MPa.

18. An optical-fiber cable according to claim 10, wherein at least one of said micromodules comprises polymeric material having a Young's modulus of between about 25 MPa and 75 MPa.

19. A drop cable, comprising:
a cable jacket that defines a longitudinal cavity; and
a micromodule positioned within the longitudinal cavity, wherein said micromodule encloses one or more optical fibers and wherein said micromodule possesses a micromodule filling coefficient of at least about 0.3;
wherein at least one of said optical fibers comprises a glass fiber and a primary coating surrounding said glass fiber, said primary coating possessing (i) an in situ modulus of less than 0.50 MPa and (ii) a glass transition temperature of less than −55° C.

20. A drop cable according to claim 19, wherein the longitudinal cavity is centrally positioned within said cable jacket.

21. A drop cable according to claim 20, comprising two strength members enclosed within said cable jacket, wherein said strength members are positioned opposite one another relative to the longitudinal cavity.

22. A drop cable according to claim 19, wherein the drop cable has a width-to-height ratio of about 2:1.

23. A drop cable according to claim 19, wherein said micromodule comprises material having a Young's modulus of between about 10 MPa and 90 MPa.

\* \* \* \* \*